(12) United States Patent
Babaei

(10) Patent No.: US 12,490,334 B2
(45) Date of Patent: Dec. 2, 2025

(54) MULTICASTING USING SMALL DATA TRANSMISSION

(71) Applicant: Parsa Wireless Communications LLC, Stamford, CT (US)

(72) Inventor: Alireza Babaei, Fairfax, VA (US)

( * ) Notice: Subject to any disclaimer, the term of this patent is extended or adjusted under 35 U.S.C. 154(b) by 278 days.

(21) Appl. No.: 18/115,597

(22) Filed: Feb. 28, 2023

(65) Prior Publication Data

US 2023/0284321 A1 Sep. 7, 2023

Related U.S. Application Data

(60) Provisional application No. 63/315,273, filed on Mar. 1, 2022.

(51) Int. Cl.
*H04W 76/20* (2018.01)
*H04W 68/02* (2009.01)

(52) U.S. Cl.
CPC ........... *H04W 76/20* (2018.02); *H04W 68/02* (2013.01)

(58) Field of Classification Search
CPC .............................. H04W 76/20; H04W 68/02
See application file for complete search history.

(56) References Cited

U.S. PATENT DOCUMENTS

| | | | |
|---|---|---|---|
| 2021/0045017 A1* | 2/2021 | Takeda | H04W 76/27 |
| 2021/0337625 A1* | 10/2021 | Tsai | H04W 76/27 |
| 2021/0410181 A1* | 12/2021 | Jeon | H04W 72/1268 |
| 2022/0039147 A1* | 2/2022 | Lei | H04W 8/24 |
| 2023/0028180 A1* | 1/2023 | Lee | H04W 4/06 |
| 2023/0093727 A1* | 3/2023 | Lin | H04L 1/0061 370/312 |

FOREIGN PATENT DOCUMENTS

| | | | | |
|---|---|---|---|---|
| WO | WO-2021163394 A1 * | 8/2021 | | H04W 36/0033 |
| WO | WO-2021204148 A1 * | 10/2021 | | |
| WO | WO-2022086109 A1 * | 4/2022 | | H04W 4/06 |

* cited by examiner

*Primary Examiner* — Kwang B Yao
(74) *Attorney, Agent, or Firm* — John F. Vodopia

(57) ABSTRACT

A method of multicasting using small data transmission (SDT) includes receiving, by a user equipment (UE) while in a radio resource control (RRC) connected state, one or more configuration parameters associated with reception of multicast SDT data, transitioning, by the UE, from the RRC connected state to an RRC inactive state, receiving, while in the RRC inactive state, a notification indicating start of a multicast SDT session, and receiving multicast SDT data pursuant to the notification.

20 Claims, 17 Drawing Sheets

| Transport channel<br>Logical channel | BCH | PCH | DL-SCH |
|---|---|---|---|
| BCCH | X | | |
| PCCH | | X | |
| CCCH | | | X |
| DCCH | | | X |
| DTCH | | | X |

FIG. 3A

| Transport channel<br>Logical channel | UL-SCH | RACH |
|---|---|---|
| CCCH | X | |
| DCCH | X | |
| DTCH | X | |

FIG. 3B

| Transport channel<br>Logical channel | SL-BCH | SL-SCH |
|---|---|---|
| SBCCH | X | |
| SCCH | | X |
| STCH | | X |

FIG. 3C

| Physical channel | PBCH | PDCCH | PDSCH | |
|---|---|---|---|---|
| Transport channel | | | | |
| BCH | X | | | |
| PCH | | | X | |
| DL-SCH | | | X | |

FIG. 4A

| Physical channel | PUSCH | PUCCH | PRACH |
|---|---|---|---|
| Transport channel | | | |
| UL-SCH | X | | |
| RACH | | | X |

FIG. 4B

| Physical channel | PSSCH | PSCCH | PSFCH | PSBCH |
|---|---|---|---|---|
| Transport channel | | | | |
| SL-BCH | | | | X |
| SL-SCH | X | | | |

FIG. 4C

| Physical Signal | DM-RS | PT-RS | PRS | CSI-RS | PSS | SSS | SRS | S-PSS | S-SSS |
|---|---|---|---|---|---|---|---|---|---|
| DL | X | X | X | X | X | X | | | |
| UL | X | X | | | | | X | | |
| SL | X | X | | X | | | | X | X |

FIG. 6

MULTICASTING USING SMALL DATA TRANSMISSION

CROSS-REFERENCE TO RELATED APPLICATION

This application claims priority under 35 USC § 119(e) from U.S. Provisional Patent Application No. 63/315,273, filed on Mar. 1, 2022 ("the provisional application"); the content of the provisional patent application is incorporated herein by reference.

BACKGROUND OF THE INVENTION

The present invention is directed to 5G, which is the 5th generation mobile network. It is a new global wireless standard after 1G, 2G, 3G, and 4G networks. 5G enables networks designed to connect machines, objects and devices.

The invention is more specifically directed to enhancing small data transmission (SDT) data transmission (e.g., MT-SDT data) during the radio resource control (RRC) inactive state. Example embodiments enhance the processes for SDT data transmission during the RRC inactive state by enabling multicast SDT data transmission during the RRC inactive state.

SUMMARY OF THE INVENTION

In an embodiment, the invention provides a method of multicasting using small data transmission (SDT) includes receiving, by a user equipment (UE) while in a radio resource control (RRC) connected state, one or more configuration parameters associated with reception of multicast SDT data, transitioning, by the UE, from the RRC connected state to an RRC inactive state, receiving, while in the RRC inactive state, a notification indicating start of a multicast SDT session, and receiving multicast SDT data pursuant to the notification.

At least one configuration parameter of the one or more configuration parameters may be used by the user equipment (UE) for reception of the multicast data in the radio resource control (RRC) connected state and the RRC inactive state. At least one configuration parameter of the one or more configuration parameters is used by the user equipment (UE) for reception of the multicast SDT data in the radio resource control (RRC) connected state and not in the RRC inactive state. At least one configuration parameter of the one or more configuration parameters may be used by the user equipment (UE) for reception of the multicast data in the radio resource control (RRC) inactive state and not in the RRC connected state.

The one or more configuration parameters may comprise one or more first parameters used to determine radio resources for reception of the multicast small data transmission (SDT) data. The one or more first parameters may be used to determine radio resources for reception of notification signaling associated with multicast small data transmission (SDT) data. The one or more configuration parameters may comprise one or more second parameters that can be used to determine radio resources for transmission of uplink feedback associated with multicast small data transmission (SDT) data. The one or more configuration parameters may comprise an identifier parameter indicating an identifier of a multicast group identifier. The one or more configuration parameters may comprise bandwidth part (BWP) parameters of one or more BWPs for reception of multicast data. The one or more configuration parameters may comprise control resource set (CORESET) parameters of one or more CORE-SETs for reception of multicast data.

The one or more configuration parameters may comprise a parameter indicating a group radio network temporary identifier (G-RNTI) or a group configured scheduling RNTI (G-CS-RNTI) used in monitoring a control channel for reception of scheduling information associated with multicast data. The one or more configuration parameters can be received based on receipt of one or more radio resource control (RRC) messages. The one or more configuration parameters may be received in response to transmission, by the user equipment (UE) to a base station, a request signaling indicating a request to join a multicast group. The notification may be based on a paging message. A signaling may be used for the notification that comprises a field with a value identifier of a multicast group.

A signaling used for the notification may be common for one or more first user equipments (UEs) in the radio resource control (RRC) connected state and one or more second UEs in the RRC inactive state. The multicast small data transmission (SDT) data may be received based on configured grant scheduling. The method can further include monitoring a control channel for a group configured scheduling radio network temporary identifier (G-CS-RNTI) for receipt of an activation signaling. The monitoring can include monitoring for a control resource set (CORESET) associated with the multicast data reception. The multicast small data transmission (SDT) data may be received based on dynamic scheduling.

The method may also include monitoring a control channel for a group radio network temporary identifier (G-RNTI) for receipt of scheduling information. The monitoring includes monitoring for a control resource set (CORESET) associated with the multicast data reception. The method can include transmitting uplink feedback associated with the multicast data reception. The uplink feedback may comprise layer 1 or layer 2 feedback. The layer 1 or layer 2 feedback may comprise hybrid automatic repeat request (HARQ) feedback. The uplink feedback may comprise application layer feedback. The uplink feedback may be based on the one or more configuration parameters. The uplink feedback may be transmitted without transitioning to the radio resource control (RRC) connected state and in the RRC inactive state. The uplink feedback may be transmitted based on transitioning to the radio resource control (RRC) connected state. For that matter, the uplink feedback, transmitted during the radio resource control (RRC) inactive state, may be based on a random access process and the random access process may be based on one or more configuration parameters received in a radio resource control (RRC) release message.

Transmitting the uplink feedback, during the radio resource control (RRC) inactive state, may be based on a configured grant resource. The grant resource may be configured based on one or more configuration parameters received in a radio resource control (RRC) release message. The uplink feedback may comprise a channel state information (CSI) report. The transitioning may be arranged to occur in response to receipt of a radio resource control (RRC) release message. The radio resource control (RRC) release message may comprise a suspend config information element (IE) indicating the transitioning.

BRIEF DESCRIPTION OF THE DRAWINGS

FIG. 3A, FIG. 3B and FIG. 3C show example mappings between logical channels and transport channels in downlink, uplink and sidelink, respectively, according to some aspects of some of various exemplary embodiments of the present disclosure.

FIG. 4A, FIG. 4B and FIG. 4C show example mappings between transport channels and physical channels in downlink, uplink and sidelink, respectively, according to some aspects of some of various exemplary embodiments of the present disclosure.

FIG. 6 shows example physical signals in downlink, uplink and sidelink according to some aspects of some of various exemplary embodiments of the present disclosure.

DETAILED DESCRIPTION

Figure 1:
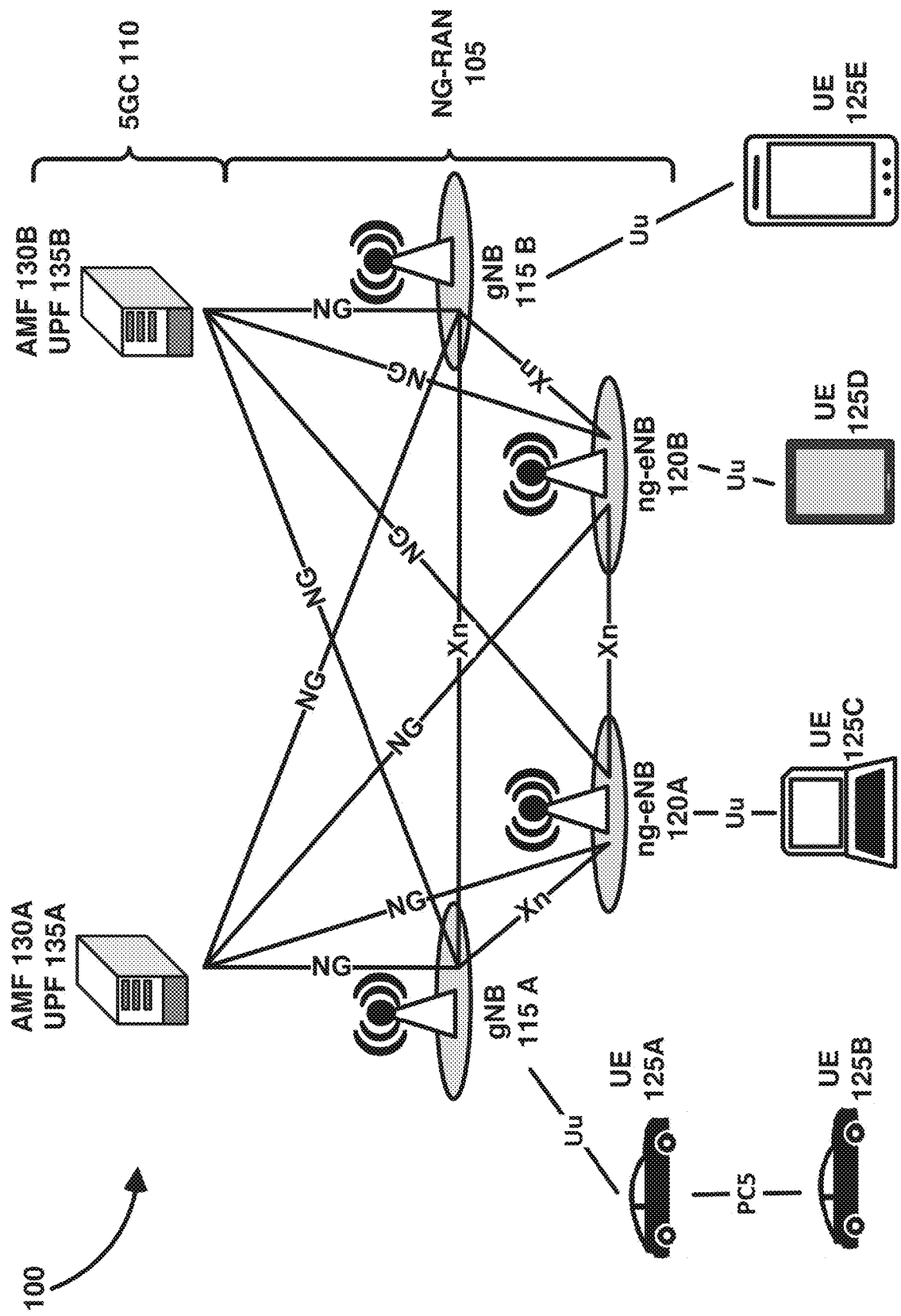
FIG. 1 shows an example of a system of mobile communications according to some aspects of some of various exemplary embodiments of the present disclosure.

FIG. 1 shows an example of a system of mobile communications 100 according to some aspects of some of various exemplary embodiments of the present disclosure. The system of mobile communication 100 may be operated by a wireless communications system operator such as a Mobile Network Operator (MNO), a private network operator, a Multiple System Operator (MSO), an Internet of Things (JOT) network operator, etc., and may offer services such as voice, data (e.g., wireless Internet access), messaging, vehicular communications services such as Vehicle to Everything (V2X) communications services, safety services, mission critical service, services in residential, commercial or industrial settings such as IoT, industrial IOT (HOT), etc.

The system of mobile communications 100 may enable various types of applications with different requirements in terms of latency, reliability, throughput, etc. Example supported applications include enhanced Mobile Broadband (eMBB), Ultra-Reliable Low-Latency Communications (URLLC), and massive Machine Type Communications (mMTC). eMBB may support stable connections with high peak data rates, as well as moderate rates for cell-edge users. URLLC may support application with strict requirements in terms of latency and reliability and moderate requirements in terms of data rate. Example mMTC application includes a network of a massive number of IoT devices, which are only sporadically active and send small data payloads.

The system of mobile communications 100 may include a Radio Access Network (RAN) portion and a core network portion. The example shown in FIG. 1 illustrates a Next Generation RAN (NG-RAN) 105 and a 5G Core Network (5GC) 110 as examples of the RAN and core network, respectively. Other examples of RAN and core network may be implemented without departing from the scope of this disclosure. Other examples of RAN include Evolved Universal Terrestrial Radio Access Network (EUTRAN), Universal Terrestrial Radio Access Network (UTRAN), etc. Other examples of core network include Evolved Packet Core (EPC), UMTS Core Network (UCN), etc. The RAN implements a Radio Access Technology (RAT) and resides between User Equipments (UEs) 125 and the core network. Examples of such RATs include New Radio (NR), Long Term Evolution (LTE) also known as Evolved Universal Terrestrial Radio Access (EUTRA), Universal Mobile Telecommunication System (UMTS), etc. The RAT of the example system of mobile communications 100 may be NR. The core network resides between the RAN and one or more external networks (e.g., data networks) and is responsible for functions such as mobility management, authentication, session management, setting up bearers and application of different Quality of Services (QoSs). The functional layer between the UE 125 and the RAN (e.g., the NG-RAN 105) may be referred to as Access Stratum (AS) and the functional layer between the UE 125 and the core network (e.g., the 5GC 110) may be referred to as Non-access Stratum (NAS).

The UEs 125 may include wireless transmission and reception means for communications with one or more nodes in the RAN, one or more relay nodes, or one or more other UEs, etc. Example of UEs include, but are not limited to, smartphones, tablets, laptops, computers, wireless transmission and/or reception units in a vehicle, V2X or Vehicle to Vehicle (V2V) devices, wireless sensors, IoT devices, IIOT devices, etc. Other names may be used for UEs such as a Mobile Station (MS), terminal equipment, terminal node, client device, mobile device, etc.

The RAN may include nodes (e.g., base stations) for communications with the UEs. For example, the NG-RAN 105 of the system of mobile communications 100 may comprise nodes for communications with the UEs 125. Different names for the RAN nodes may be used, for example depending on the RAT used for the RAN. A RAN node may be referred to as Node B (NB) in a RAN that uses the UMTS RAT. A RAN node may be referred to as an evolved Node B (eNB) in a RAN that uses LTE/EUTRA RAT. For the illustrative example of the system of mobile communications 100 in FIG. 1, the nodes of an NG-RAN 105 may be either a next generation Node B (gNB) 115 or a next generation evolved Node B (ng-eNB) 120. In this specification, the terms base station, RAN node, gNB and ng-eNB may be used interchangeably. The gNB 115 may provide NR user plane and control plane protocol terminations towards the UE 125. The ng-eNB 120 may provide E-UTRA user plane and control plane protocol terminations towards the UE 125. An interface between the gNB 115 and the UE 125 or between the ng-eNB 120 and the UE 125 may be referred to as a Uu interface. The Uu interface may be established with a user plane protocol stack and a control plane protocol stack. For a Uu interface, the direction from the base station (e.g., the gNB 115 or the ng-eNB 120) to the UE 125 may be referred to as downlink and the direction from the UE 125 to the base station (e.g., gNB 115 or ng-eNB 120) may be referred to as uplink.

The gNBs 115 and ng-eNBs 120 may be interconnected with each other by means of an Xn interface. The Xn interface may comprise an Xn User plane (Xn-U) interface and an Xn Control plane (Xn-C) interface. The transport network layer of the Xn-U interface may be built on Internet Protocol (IP) transport and GPRS Tunneling Protocol (GTP) may be used on top of User Datagram Protocol (UDP)/IP to carry the user plane protocol data units (PDUs). Xn-U may provide non-guaranteed delivery of user plane PDUs and may support data forwarding and flow control. The transport network layer of the Xn-C interface may be built on Stream Control Transport Protocol (SCTP) on top of IP. The application layer signaling protocol may be referred to as XnAP (Xn Application Protocol). The SCTP layer may provide the guaranteed delivery of application layer messages. In the transport IP layer, point-to-point transmission may be used to deliver the signaling PDUs. The Xn-C interface may support Xn interface management, UE mobility management, including context transfer and RAN paging, and dual connectivity.

The gNBs 115 and ng-eNBs 120 may also be connected to the 5GC 110 by means of the NG interfaces, more specifically to an Access and Mobility Management Function (AMF) 130 of the 5GC 110 by means of the NG-C interface and to a User Plane Function (UPF) 135 of the 5GC 110 by means of the NG-U interface. The transport network layer of the NG-U interface may be built on IP transport and GTP protocol may be used on top of UDP/IP to carry the user plane PDUs between the NG-RAN node (e.g., gNB 115 or ng-eNB 120) and the UPF 135. NG-U may provide non-guaranteed delivery of user plane PDUs between the NG-RAN node and the UPF. The transport network layer of the NG-C interface may be built on IP transport. For the reliable transport of signaling messages, SCTP may be added on top of IP. The application layer signaling protocol may be referred to as NGAP (NG Application Protocol). The SCTP layer may provide guaranteed delivery of application layer messages. In the transport, IP layer point-to-point transmission may be used to deliver the signaling PDUs. The NG-C interface may provide the following functions: NG interface management; UE context management; UE mobility management; transport of NAS messages; paging; PDU Session Management; configuration transfer; and warning message transmission.

The gNB 115 or the ng-eNB 120 may host one or more of the following functions: Radio Resource Management functions such as Radio Bearer Control, Radio Admission Control, Connection Mobility Control, Dynamic allocation of resources to UEs in both uplink and downlink (e.g., scheduling); IP and Ethernet header compression, encryption and integrity protection of data; Selection of an AMF at UE attachment when no routing to an AMF can be determined from the information provided by the UE; Routing of User Plane data towards UPF(s); Routing of Control Plane information towards AMF; Connection setup and release; Scheduling and transmission of paging messages; Scheduling and transmission of system broadcast information (e.g., originated from the AMF); Measurement and measurement reporting configuration for mobility and scheduling; Transport level packet marking in the uplink; Session Management; Support of Network Slicing; QoS Flow management and mapping to data radio bearers; Support of UEs in RRC Inactive state; Distribution function for NAS messages; Radio access network sharing; Dual Connectivity; Tight interworking between NR and E-UTRA; and Maintaining security and radio configuration for User Plane 5G system (5GS) Cellular IoT (CIoT) Optimization.

The AMF 130 may host one or more of the following functions: NAS signaling termination; NAS signaling security; AS Security control; Inter CN node signaling for mobility between 3GPP access networks; Idle mode UE Reachability (including control and execution of paging retransmission); Registration Area management; Support of intra-system and inter-system mobility; Access Authentication; Access Authorization including check of roaming rights; Mobility management control (subscription and policies); Support of Network Slicing; Session Management Function (SMF) selection; Selection of 5GS CIoT optimizations.

The UPF 135 may host one or more of the following functions: Anchor point for Intra-/Inter-RAT mobility (when applicable); External PDU session point of interconnect to Data Network; Packet routing 8r, forwarding; Packet inspection and User plane part of Policy rule enforcement; Traffic usage reporting; Uplink classifier to support routing traffic flows to a data network; Branching point to support multi-homed PDU session; QoS handling for user plane, e.g. packet filtering, gating, UL/DL rate enforcement; Uplink Traffic verification (Service Data Flow (SDF) to QoS flow mapping); Downlink packet buffering and downlink data notification triggering.

As shown in FIG. 1, the NG-RAN 105 may support the PC5 interface between two UEs 125 (e.g., UE 125A and UE 125B). In the PC5 interface, the direction of communications between two UEs (e.g., from UE 125A to UE 125B or vice versa) may be referred to as sidelink. Sidelink transmission and reception over the PC5 interface may be supported when the UE 125 is inside NG-RAN 105 coverage, irrespective of which RRC state the UE is in, and when the UE 125 is outside NG-RAN 105 coverage. Support of V2X services via the PC5 interface may be provided by NR sidelink communication and/or V2X sidelink communication.

PC5-S signaling may be used for unicast link establishment with Direct Communication Request/Accept message. A UE may self-assign its source Layer-2 ID for the PC5 unicast link for example based on the V2X service type. During unicast link establishment procedure, the UE may send its source Layer-2 ID for the PC5 unicast link to the peer UE, e.g., the UE for which a destination ID has been received from the upper layers. A pair of source Layer-2 ID and destination Layer-2 ID may uniquely identify a unicast link. The receiving UE may verify that the said destination ID belongs to it and may accept the Unicast link establishment request from the source UE. During the PC5 unicast link establishment procedure, a PC5-RRC procedure on the Access Stratum may be invoked for the purpose of UE sidelink context establishment as well as for AS layer configurations, capability exchange etc. PC5-RRC signaling may enable exchanging UE capabilities and AS layer configurations such as Sidelink Radio Bearer configurations between pair of UEs for which a PC5 unicast link is established.

NR sidelink communication may support one of three types of transmission modes (e.g., Unicast transmission, Groupcast transmission, and Broadcast transmission) for a pair of a Source Layer-2 ID and a Destination Layer-2 ID in the AS. The Unicast transmission mode may be characterized by: Support of one PC5-RRC connection between peer UEs for the pair; Transmission and reception of control information and user traffic between peer UEs in sidelink; Support of sidelink HARQ feedback; Support of sidelink transmit power control; Support of RLC Acknowledged Mode (AM); and Detection of radio link failure for the PC5-RRC connection. The Groupcast transmission may be characterized by: Transmission and reception of user traffic among UEs belonging to a group in sidelink; and Support of sidelink HARQ feedback. The Broadcast transmission may be characterized by: Transmission and reception of user traffic among UEs in sidelink.

A Source Layer-2 ID, a Destination Layer-2 ID and a PC5 Link Identifier may be used for NR sidelink communication. The Source Layer-2 ID may be a link-layer identity that identifies a device or a group of devices that are recipients of sidelink communication frames. The Destination Layer-2 ID may be a link-layer identity that identifies a device that originates sidelink communication frames. In some examples, the Source Layer-2 ID and the Destination Layer-2 ID may be assigned by a management function in the Core Network. The Source Layer-2 ID may identify the sender of the data in NR sidelink communication. The Source Layer-2 ID may be 24 bits long and may be split in the MAC layer into two bit strings: One bit string may be the LSB part (8 bits) of Source Layer-2 ID and forwarded to physical layer of the sender. This may identify the source of the intended data in sidelink control information and may be used for filtering of packets at the physical layer of the receiver; and the Second bit string may be the MSB part (16 bits) of the Source Layer-2 ID and may be carried within the Medium Access Control (MAC) header. This may be used for filtering of packets at the MAC layer of the receiver. The Destination Layer-2 ID may identify the target of the data in NR sidelink communication. For NR sidelink communication, the Destination Layer-2 ID may be 24 bits long and may be split in the MAC layer into two bit strings: One bit string may be the LSB part (16 bits) of Destination Layer-2 ID and forwarded to physical layer of the sender. This may identify the target of the intended data in sidelink control information and may be used for filtering of packets at the physical layer of the receiver; and the Second bit string may be the MSB part (8 bits) of the Destination Layer-2 ID and may be carried within the MAC header. This may be used for filtering of packets at the MAC layer of the receiver. The PC5 Link Identifier may uniquely identify the PC5 unicast link in a UE for the lifetime of the PC5 unicast link. The PC5 Link Identifier may be used to indicate the PC5 unicast link whose sidelink Radio Link failure (RLF) declaration was made and PC5-RRC connection was released.

Figure 2A:
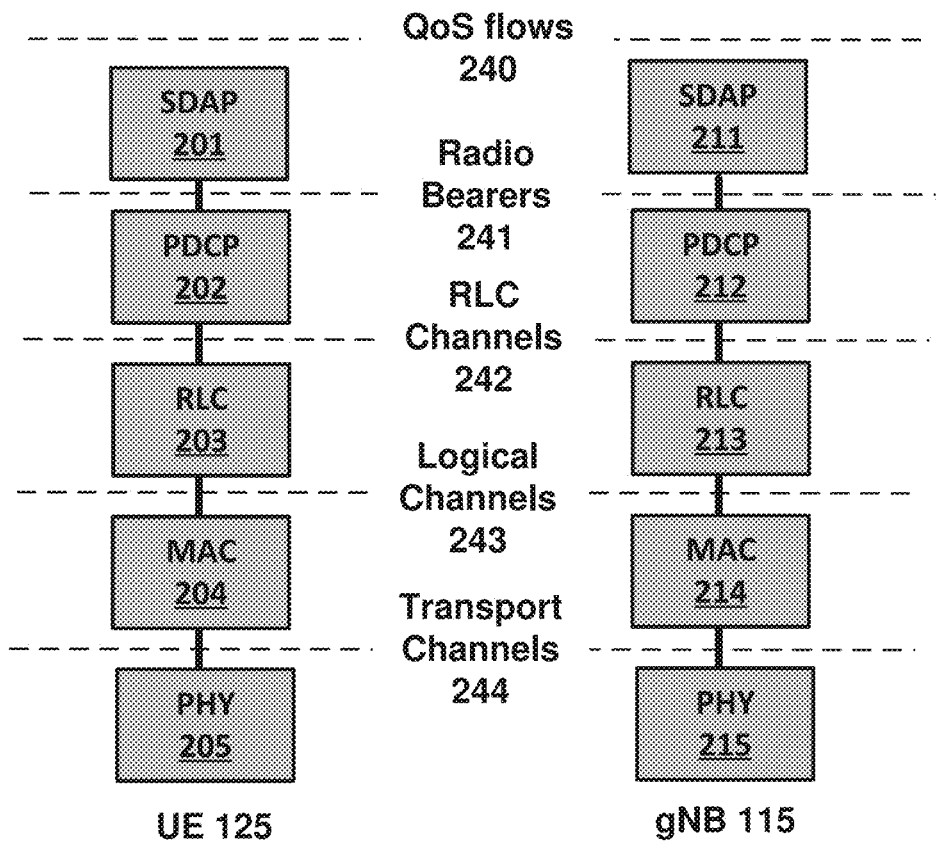
FIG. 2A and FIG. 2B show examples of radio protocol stacks for user plane and control plane, respectively, according to some aspects of some of various exemplary embodiments of the present disclosure.
Figure 2B:
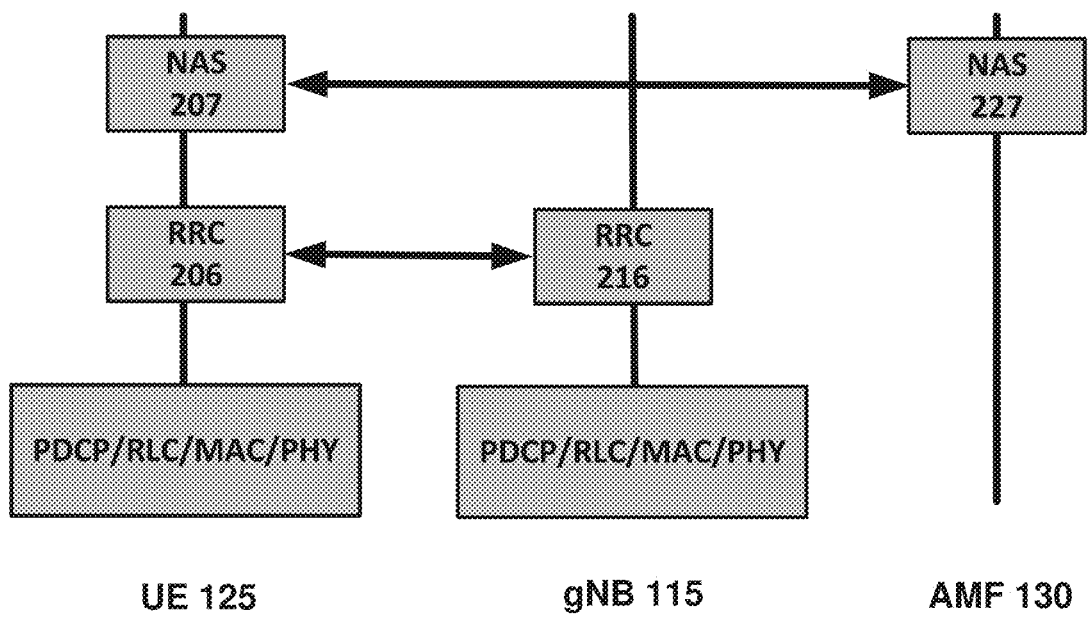

FIG. 2A and FIG. 2B show examples of radio protocol stacks for user plane and control plane, respectively, according to some aspects of some of various exemplary embodiments of the present disclosure. As shown in FIG. 2A, the protocol stack for the user plane of the Uu interface (between the UE 125 and the gNB 115) includes Service Data Adaptation Protocol (SDAP) 201 and SDAP 211, Packet Data Convergence Protocol (PDCP) 202 and PDCP 212, Radio Link Control (RLC) 203 and RLC 213, MAC 204 and MAC 214 sublayers of layer 2 and Physical (PHY) 205 and PHY 215 layer (layer 1 also referred to as L1).

The PHY 205 and PHY 215 offer transport channels 244 to the MAC 204 and MAC 214 sublayer. The MAC 204 and MAC 214 sublayer offer logical channels 243 to the RLC 203 and RLC 213 sublayer. The RLC 203 and RLC 213 sublayer offer RLC channels 242 to the PDCP 202 and PCP 212 sublayer. The PDCP 202 and PDCP 212 sublayer offer radio bearers 241 to the SDAP 201 and SDAP 211 sublayer. Radio bearers may be categorized into two groups: Data Radio Bearers (DRBs) for user plane data and Signaling Radio Bearers (SRBs) for control plane data. The SDAP 201 and SDAP 211 sublayer offers QoS flows 240 to 5GC.

The main services and functions of the MAC 204 or MAC 214 sublayer include: mapping between logical channels and transport channels; Multiplexing/demultiplexing of MAC Service Data Units (SDUs) belonging to one or different logical channels into/from Transport Blocks (TB) delivered to/from the physical layer on transport channels; Scheduling information reporting; Error correction through Hybrid Automatic Repeat Request (HARQ) (one HARQ entity per cell in case of carrier aggregation (CA)); Priority handling between UEs by means of dynamic scheduling; Priority handling between logical channels of one UE by means of Logical Channel Prioritization (LCP); Priority handling between overlapping resources of one UE; and Padding. A single MAC entity may support multiple numerologies, transmission timings and cells. Mapping restrictions in logical channel prioritization control which numerology(ies), cell(s), and transmission timing(s) a logical channel may use.

The HARQ functionality may ensure delivery between peer entities at Layer 1. A single HARQ process may support one TB when the physical layer is not configured for downlink/uplink spatial multiplexing, and when the physical layer is configured for downlink/uplink spatial multiplexing, a single HARQ process may support one or multiple TBs.

The RLC 203 or RLC 213 sublayer may support three transmission modes: Transparent Mode (TM); Unacknowledged Mode (UM); and Acknowledged Mode (AM). The RLC configuration may be per logical channel with no dependency on numerologies and/or transmission durations, and Automatic Repeat Request (ARQ) may operate on any of the numerologies and/or transmission durations the logical channel is configured with.

The main services and functions of the RLC 203 or RLC 213 sublayer depend on the transmission mode (e.g., TM, UM or AM) and may include: Transfer of upper layer PDUs; Sequence numbering independent of the one in PDCP (UM and AM); Error Correction through ARQ (AM only); Segmentation (AM and UM) and re-segmentation (AM only) of RLC SDUs; Reassembly of SDU (AM and UM); Duplicate Detection (AM only); RLC SDU discard (AM and UM); RLC re-establishment; and Protocol error detection (AM only).

The automatic repeat request within the RLC 203 or RLC 213 sublayer may have the following characteristics: ARQ retransmits RLC SDUs or RLC SDU segments based on RLC status reports; Polling for RLC status report may be used when needed by RLC; RLC receiver may also trigger RLC status report after detecting a missing RLC SDU or RLC SDU segment.

The main services and functions of the PDCP 202 or PDCP 212 sublayer may include: Transfer of data (user plane or control plane); Maintenance of PDCP Sequence Numbers (SNs); Header compression and decompression using the Robust Header Compression (ROHC) protocol; Header compression and decompression using EHC protocol; Ciphering and deciphering; Integrity protection and integrity verification; Timer based SDU discard; Routing for split bearers; Duplication; Reordering and in-order delivery; Out-of-order delivery; and Duplicate discarding.

The main services and functions of SDAP 201 or SDAP 211 include: Mapping between a QoS flow and a data radio bearer; and Marking QoS Flow ID (QFI) in both downlink and uplink packets. A single protocol entity of SDAP may be configured for each individual PDU session.

As shown in FIG. 2B, the protocol stack of the control plane of the Uu interface (between the UE 125 and the gNB 115) includes PHY layer (layer 1), and MAC, RLC and PDCP sublayers of layer 2 as described above and in addition, the RRC 206 sublayer and RRC 216 sublayer. The main services and functions of the RRC 206 sublayer and the RRC 216 sublayer over the Uu interface include: Broadcast of System Information related to AS and NAS; Paging initiated by 5GC or NG-RAN; Establishment, maintenance and release of an RRC connection between the UE and NG-RAN (including Addition, modification and release of carrier aggregation; and Addition, modification and release of Dual Connectivity in NR or between E-UTRA and NR); Security functions including key management; Establishment, configuration, maintenance and release of SRBs and DRBs; Mobility functions (including Handover and context transfer; UE cell selection and reselection and control of cell selection and reselection; and Inter-RAT mobility); QoS management functions; UE measurement reporting and control of the reporting; Detection of and recovery from radio link failure; and NAS message transfer to/from NAS from/to UE. The NAS 207 and NAS 227 layer is a control protocol (terminated in AMF on the network side) that performs the functions such as authentication, mobility management, security control, etc.

The sidelink specific services and functions of the RRC sublayer over the Uu interface include: Configuration of sidelink resource allocation via system information or dedicated signaling; Reporting of UE sidelink information; Measurement configuration and reporting related to sidelink; and Reporting of UE assistance information for SL traffic pattern(s).

FIG. 3A, FIG. 3B and FIG. 3C show example mappings between logical channels and transport channels in downlink, uplink and sidelink, respectively, according to some aspects of some of various exemplary embodiments of the present disclosure. Different kinds of data transfer services may be offered by MAC. Each logical channel type may be defined by what type of information is transferred. Logical channels may be classified into two groups: Control Channels and Traffic Channels. Control channels may be used for the transfer of control plane information only. The Broadcast Control Channel (BCCH) is a downlink channel for broadcasting system control information. The Paging Control Channel (PCCH) is a downlink channel that carries paging messages. The Common Control Channel (CCCH) is channel for transmitting control information between UEs and network. This channel may be used for UEs having no RRC connection with the network. The Dedicated Control Channel (DCCH) is a point-to-point bi-directional channel that transmits dedicated control information between a UE and the network and may be used by UEs having an RRC connection. Traffic channels may be used for the transfer of user plane information only. The Dedicated Traffic Channel (DTCH) is a point-to-point channel, dedicated to one UE, for the transfer of user information. A DTCH may exist in both uplink and downlink. Sidelink Control Channel (SCCH) is a sidelink channel for transmitting control information (e.g., PC5-RRC and PC5-S messages) from one UE to other UE(s). Sidelink Traffic Channel (STCH) is a sidelink channel for transmitting user information from one UE to other UE(s). Sidelink Broadcast Control Channel (SBCCH) is a sidelink channel for broadcasting sidelink system information from one UE to other UE(s).

The downlink transport channel types include Broadcast Channel (BCH), Downlink Shared Channel (DL-SCH), and Paging Channel (PCH). The BCH may be characterized by: fixed, pre-defined transport format; and requirement to be broadcast in the entire coverage area of the cell, either as a single message or by beamforming different BCH instances. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; and the support for UE Discontinuous Reception (DRX) to enable UE power saving. The DL-SCH may be characterized by: support for HARQ; support for dynamic link adaptation by varying the modulation, coding and transmit power; possibility to be broadcast in the entire cell; possibility to use beamforming; support for both dynamic and semi-static resource allocation; support for UE discontinuous reception (DRX) to enable UE power saving. The PCH may be characterized by: support for UE discontinuous reception (DRX) to enable UE power saving (DRX cycle is indicated by the network to the UE); requirement to be broadcast in the entire coverage area of the cell, either as a single message or by beamforming different BCH instances; mapped to physical resources which can be used dynamically also for traffic/other control channels.

In downlink, the following connections between logical channels and transport channels may exist: BCCH may be mapped to BCH; BCCH may be mapped to DL-SCH; PCCH may be mapped to PCH; CCCH may be mapped to DL-SCH; DCCH may be mapped to DL-SCH; and DTCH may be mapped to DL-SCH.

The uplink transport channel types include Uplink Shared Channel (UL-SCH) and Random Access Channel(s) (RACH). The UL-SCH may be characterized by possibility to use beamforming; support for dynamic link adaptation by varying the transmit power and potentially modulation and coding; support for HARQ; support for both dynamic and semi-static resource allocation. The RACH may be characterized by limited control information; and collision risk.

In Uplink, the following connections between logical channels and transport channels may exist: CCCH may be mapped to UL-SCH; DCCH may be mapped to UL-SCH; and DTCH may be mapped to UL-SCH.

The sidelink transport channel types include: Sidelink broadcast channel (SL-BCH) and Sidelink shared channel (SL-SCH). The SL-BCH may be characterized by pre-defined transport format. The SL-SCH may be characterized by support for unicast transmission, groupcast transmission and broadcast transmission; support for both UE autonomous resource selection and scheduled resource allocation by NG-RAN; support for both dynamic and semi-static resource allocation when UE is allocated resources by the NG-RAN; support for HARQ; and support for dynamic link adaptation by varying the transmit power, modulation and coding.

In the sidelink, the following connections between logical channels and transport channels may exist: SCCH may be mapped to SL-SCH; STCH may be mapped to SL-SCH; and SBCCH may be mapped to SL-BCH.

FIG. 4A, FIG. 4B and FIG. 4C show example mappings between transport channels and physical channels in downlink, uplink and sidelink, respectively, according to some aspects of some of various exemplary embodiments of the present disclosure. The physical channels in downlink include Physical Downlink Shared Channel (PDSCH), Physical Downlink Control Channel (PDCCH) and Physical Broadcast Channel (PBCH). The PCH and DL-SCH transport channels are mapped to the PDSCH. The BCH transport channel is mapped to the PBCH. A transport channel is not mapped to the PDCCH but Downlink Control Information (DCI) is transmitted via the PDCCH.

The physical channels in the uplink include Physical Uplink Shared Channel (PUSCH), Physical Uplink Control Channel (PUCCH) and Physical Random Access Channel (PRACH). The UL-SCH transport channel may be mapped to the PUSCH and the RACH transport channel may be mapped to the PRACH. A transport channel is not mapped to the PUCCH but Uplink Control Information (UCI) is transmitted via the PUCCH.

The physical channels in the sidelink include Physical Sidelink Shared Channel (PSSCH), Physical Sidelink Control Channel (PSCCH), Physical Sidelink Feedback Channel (PSFCH) and Physical Sidelink Broadcast Channel (PSBCH). The Physical Sidelink Control Channel (PSCCH) may indicate resource and other transmission parameters used by a UE for PSSCH. The Physical Sidelink Shared Channel (PSSCH) may transmit the TBs of data themselves, and control information for HARQ procedures and CSI feedback triggers, etc. At least 6 OFDM symbols within a slot may be used for PSSCH transmission. Physical Sidelink Feedback Channel (PSFCH) may carry the HARQ feedback over the sidelink from a UE which is an intended recipient of a PSSCH transmission to the UE which performed the transmission. PSFCH sequence may be transmitted in one PRB repeated over two OFDM symbols near the end of the sidelink resource in a slot. The SL-SCH transport channel may be mapped to the PSSCH. The SL-BCH may be mapped to PSBCH. No transport channel is mapped to the PSFCH but Sidelink Feedback Control Information (SFCI) may be mapped to the PSFCH. No transport channel is mapped to PSCCH but Sidelink Control Information (SCI) may mapped to the PSCCH.

Figure 5A:
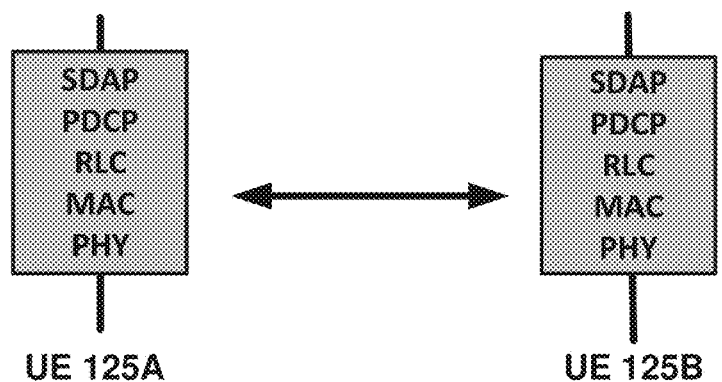
FIG. 5A, FIG. 5B, FIG. 5C and FIG. 5D show examples of radio protocol stacks for NR sidelink communication according to some aspects of some of various exemplary embodiments of the present disclosure.
Figure 5B:
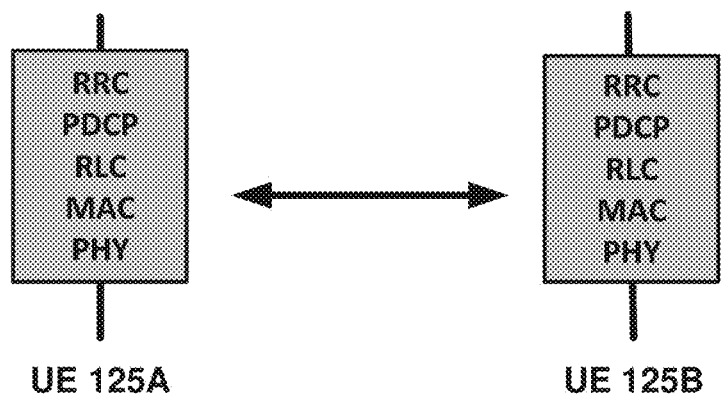
Figure 5C:
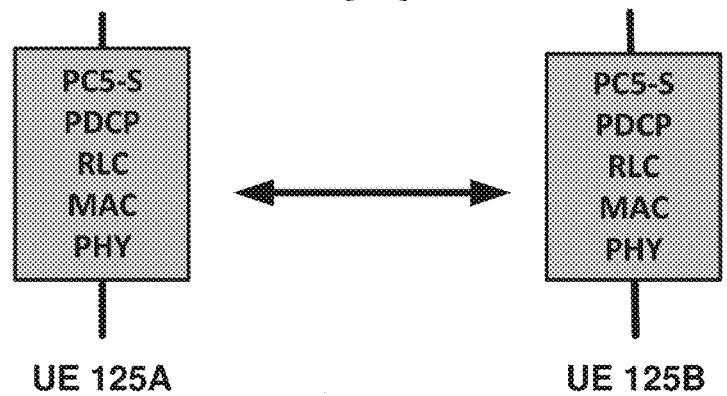
Figure 5D:
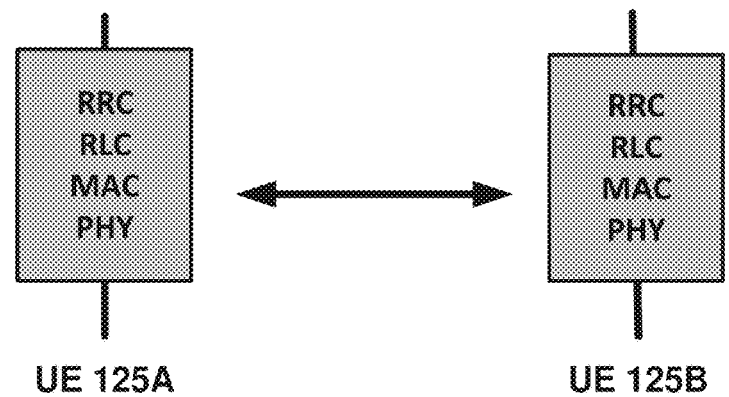

FIG. 5A, FIG. 5B, FIG. 5C and FIG. 5D show examples of radio protocol stacks for NR sidelink communication according to some aspects of some of various exemplary embodiments of the present disclosure. The AS protocol stack for user plane in the PC5 interface (i.e., for STCH) may consist of SDAP, PDCP, RLC and MAC sublayers, and the physical layer. The protocol stack of user plane is shown in FIG. 5A. The AS protocol stack for SBCCH in the PC5 interface may consist of RRC, RLC, MAC sublayers, and the physical layer as shown below in FIG. 5B. For support of PC5-S protocol, PC5-S is located on top of PDCP, RLC and MAC sublayers, and the physical layer in the control plane protocol stack for SCCH for PC5-S, as shown in FIG. 5C. The AS protocol stack for the control plane for SCCH for RRC in the PC5 interface consists of RRC, PDCP, RLC and MAC sublayers, and the physical layer. The protocol stack of control plane for SCCH for RRC is shown in FIG. 5D.

The Sidelink Radio Bearers (SLRBs) may be categorized into two groups: Sidelink Data Radio Bearers (SL DRB) for user plane data and Sidelink Signaling Radio Bearers (SL SRB) for control plane data. Separate SL SRBs using different SCCHs may be configured for PC5-RRC and PC5-S signaling, respectively.

The MAC sublayer may provide the following services and functions over the PC5 interface: Radio resource selection; Packet filtering; Priority handling between uplink and sidelink transmissions for a given UE; and Sidelink CSI reporting. With logical channel prioritization restrictions in MAC, only sidelink logical channels belonging to the same destination may be multiplexed into a MAC PDU for every unicast, groupcast and broadcast transmission which may be associated to the destination. For packet filtering, a SL-SCH MAC header including portions of both Source Layer-2 ID and a Destination Layer-2 ID may be added to a MAC PDU. The Logical Channel Identifier (LCID) included within a MAC subheader may uniquely identify a logical channel within the scope of the Source Layer-2 ID and Destination Layer-2 ID combination.

The services and functions of the RLC sublayer may be supported for sidelink. Both RLC Unacknowledged Mode (UM) and Acknowledged Mode (AM) may be used in unicast transmission while only UM may be used in groupcast or broadcast transmission. For UM, only unidirectional transmission may be supported for groupcast and broadcast.

The services and functions of the PDCP sublayer for the Uu interface may be supported for sidelink with some restrictions: Out-of-order delivery may be supported only for unicast transmission; and Duplication may not be supported over the PC5 interface.

The SDAP sublayer may provide the following service and function over the PC5 interface: Mapping between a QoS flow and a sidelink data radio bearer. There may be one SDAP entity per destination for one of unicast, groupcast and broadcast which is associated to the destination.

The RRC sublayer may provide the following services and functions over the PC5 interface: Transfer of a PC5-RRC message between peer UEs; Maintenance and release of a PC5-RRC connection between two UEs; and Detection of sidelink radio link failure for a PC5-RRC connection based on indication from MAC or RLC. A PC5-RRC connection may be a logical connection between two UEs for a pair of Source and Destination Layer-2 IDs which may be considered to be established after a corresponding PC5 unicast link is established. There may be one-to-one correspondence between the PC5-RRC connection and the PC5 unicast link. A UE may have multiple PC5-RRC connections with one or more UEs for different pairs of Source and Destination Layer-2 IDs. Separate PC5-RRC procedures and messages may be used for a UE to transfer UE capability and sidelink configuration including SL-DRB configuration to the peer UE. Both peer UEs may exchange their own UE capability and sidelink configuration using separate bi-directional procedures in both sidelink directions.

FIG. 6 shows example physical signals in downlink, uplink and sidelink according to some aspects of some of various exemplary embodiments of the present disclosure. The Demodulation Reference Signal (DM-RS) may be used in downlink, uplink and sidelink and may be used for channel estimation. DM-RS is a UE-specific reference signal and may be transmitted together with a physical channel in downlink, uplink or sidelink and may be used for channel estimation and coherent detection of the physical channel. The Phase Tracking Reference Signal (PT-RS) may be used in downlink, uplink and sidelink and may be used for tracking the phase and mitigating the performance loss due to phase noise. The PT-RS may be used mainly to estimate and minimize the effect of Common Phase Error (CPE) on system performance. Due to the phase noise properties, PT-RS signal may have a low density in the frequency domain and a high density in the time domain. PT-RS may occur in combination with DM-RS and when the network has configured PT-RS to be present. The Positioning Reference Signal (PRS) may be used in downlink for positioning using different positioning techniques. PRS may be used to measure the delays of the downlink transmissions by correlating the received signal from the base station with a local replica in the receiver. The Channel State Information Reference Signal (CSI-RS) may be used in downlink and sidelink. CSI-RS may be used for channel state estimation, Reference Signal Received Power (RSRP) measurement for mobility and beam management, time/frequency tracking for demodulation among other uses. CSI-RS may be configured UE-specifically but multiple users may share the same CSI-RS resource. The UE may determine CSI reports and transit them in the uplink to the base station using PUCCH or PUSCH. The CSI report may be carried in a sidelink MAC CE. The Primary Synchronization Signal (PSS) and the Secondary Synchronization Signal (SSS) may be used for radio fame synchronization. The PSS and SSS may be used for the cell search procedure during the initial attach or for mobility purposes. The Sounding Reference Signal (SRS) may be used in uplink for uplink channel estimation. Similar to CSI-RS, the SRS may serve as QCL reference for other physical channels such that they can be configured and transmitted quasi-collocated with SRS. The Sidelink PSS (S-PSS) and Sidelink SSS (S-SSS) may be used in sidelink for sidelink synchronization.

Figure 7:
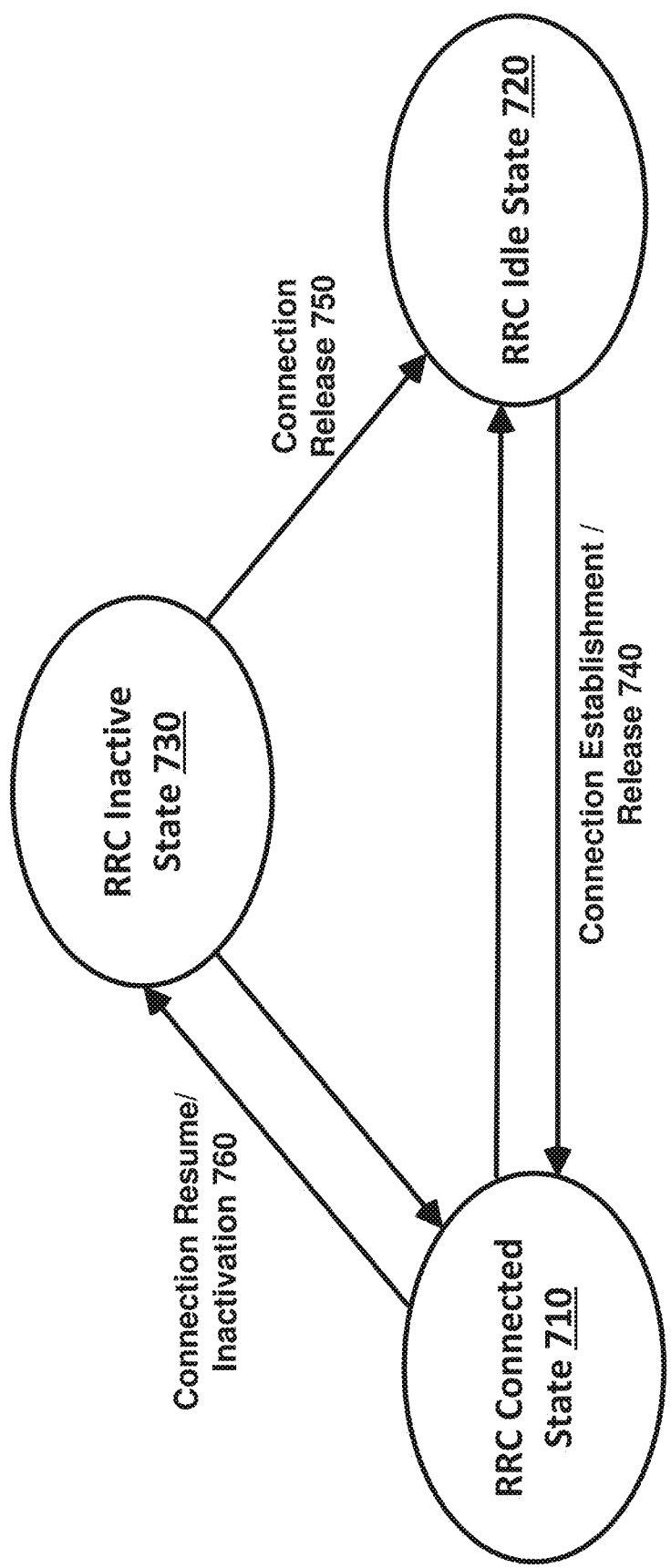
FIG. 7 shows examples of Radio Resource Control (RRC) states and transitioning between different RRC states according to some aspects of some of various exemplary embodiments of the present disclosure.

FIG. 7 shows examples of Radio Resource Control (RRC) states and transitioning between different RRC states according to some aspects of some of various exemplary embodiments of the present disclosure. A UE may be in one of three RRC states: RRC Connected State 710, RRC Idle State 720 and RRC Inactive state 730. After power up, the UE may be in RRC Idle state 720 and the UE may establish connection with the network using initial access and via an RRC connection establishment procedure to perform data transfer and/or to make/receive voice calls. Once RRC connection is established, the UE may be in RRC Connected State 710. The UE may transition from the RRC Idle state 720 to the RRC connected state 710 or from the RRC Connected State 710 to the RRC Idle state 720 using the RRC connection Establishment/Release procedures 740.

To reduce the signaling load and the latency resulting from frequent transitioning from the RRC Connected State 710 to the RRC Idle State 720 when the UE transmits frequent small data, the RRC Inactive State 730 may be used. In the RRC Inactive State 730, the AS context may be stored by both UE and gNB. This may result in faster state transition from the RRC Inactive State 730 to RRC Connected State 710. The UE may transition from the RRC Inactive State 730 to the RRC Connected State 710 or from the RRC Connected State 710 to the RRC Inactive State 730 using the RRC Connection Resume/Inactivation procedures 760. The UE may transition from the RRC Inactive State 730 to RRC Idle State 720 using an RRC Connection Release procedure 750.

Figure 8:
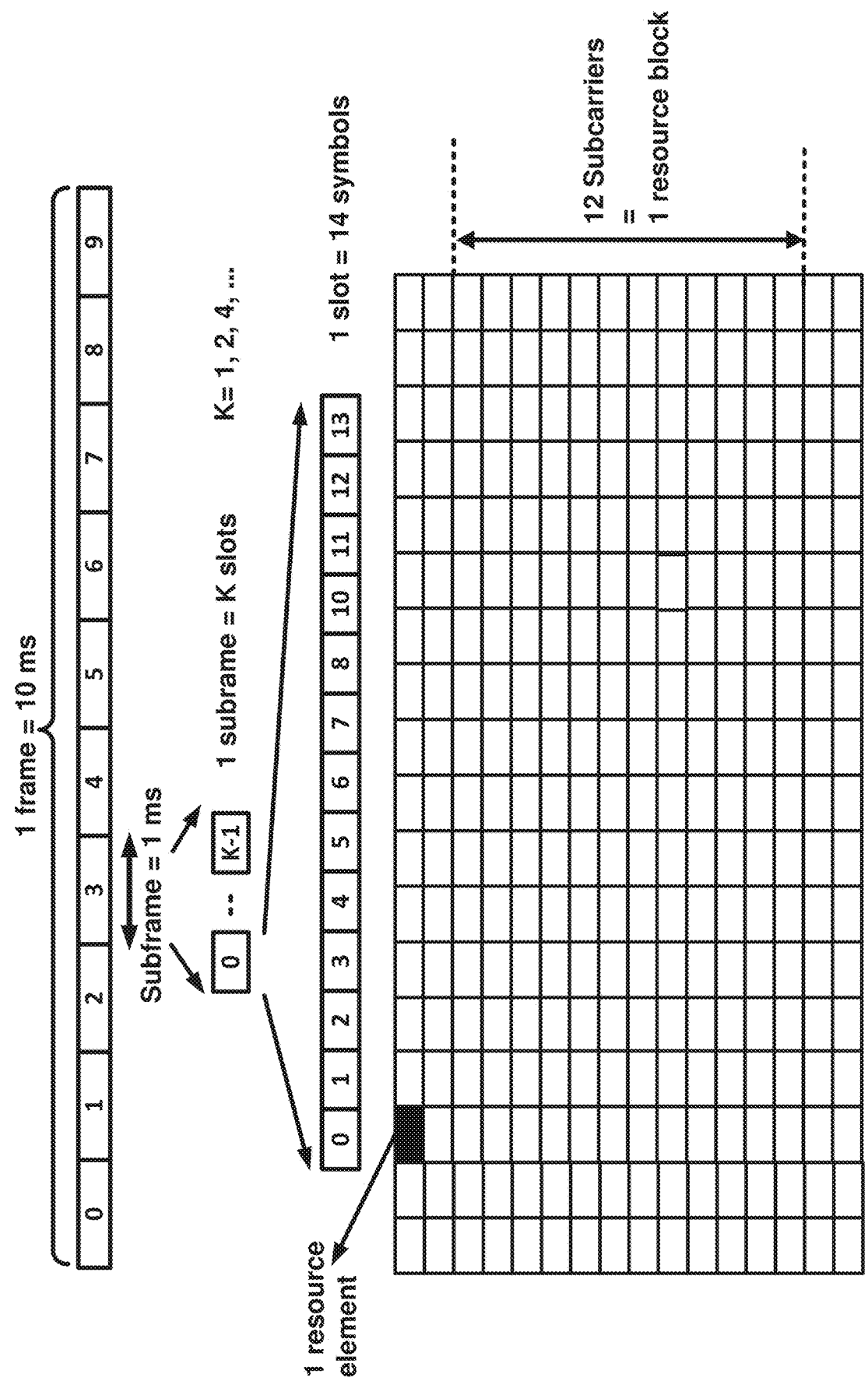
FIG. 8 shows example frame structure and physical resources according to some aspects of some of various exemplary embodiments of the present disclosure.

FIG. 8 shows example frame structure and physical resources according to some aspects of some of various exemplary embodiments of the present disclosure. The downlink or uplink or sidelink transmissions may be organized into frames with 10 ms duration, consisting of ten 1 ms subframes. Each subframe may consist of 1, 2, 4, . . . slots, wherein the number of slots per subframe may depend on the subcarrier spacing of the carrier on which the transmission takes place. The slot duration may be 14 symbols with Normal Cyclic Prefix (CP) and 12 symbols with Extended CP and may scale in time as a function of the used subcarrier spacing so that there is an integer number of slots in a subframe. FIG. 8 shows a resource grid in time and frequency domain. Each element of the resource grid, comprising one symbol in time and one subcarrier in frequency, is referred to as a Resource Element (RE). A Resource Block (RB) may be defined as 12 consecutive subcarriers in the frequency domain.

In some examples and with non-slot-based scheduling, the transmission of a packet may occur over a portion of a slot, for example during 2, 4 or 7 OFDM symbols which may also be referred to as mini-slots. The mini-slots may be used for low latency applications such as URLLC and operation in unlicensed bands. In some embodiments, the mini-slots may also be used for fast flexible scheduling of services (e.g., pre-emption of URLLC over eMBB).

Figure 9:
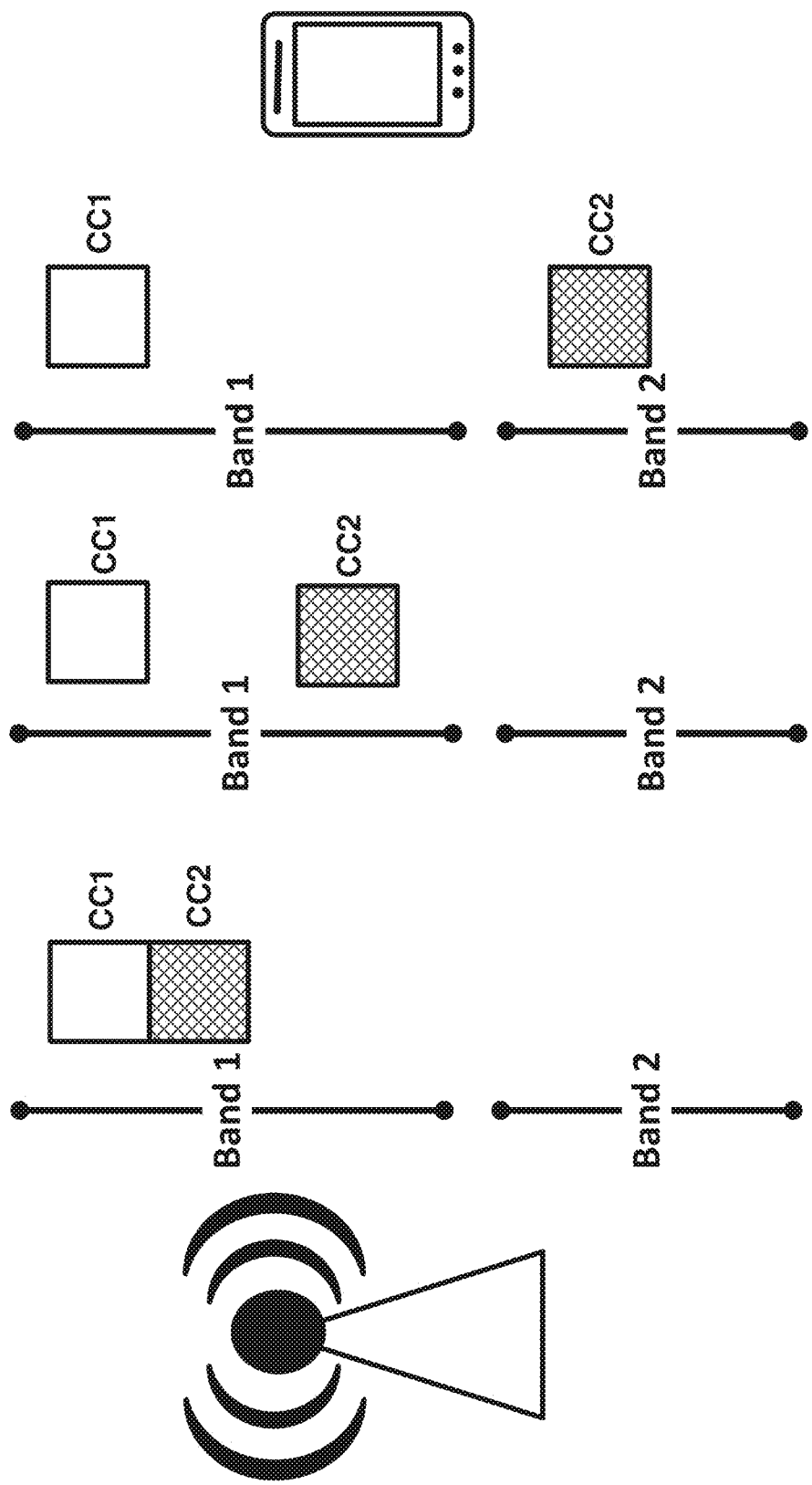
FIG. 9 shows example component carrier configurations in different carrier aggregation scenarios according to some aspects of some of various exemplary embodiments of the present disclosure.

FIG. 9 shows example component carrier configurations in different carrier aggregation scenarios according to some aspects of some of various exemplary embodiments of the present disclosure. In Carrier Aggregation (CA), two or more Component Carriers (CCs) may be aggregated. A UE may simultaneously receive or transmit on one or multiple CCs depending on its capabilities. CA may be supported for both contiguous and non-contiguous CCs in the same band or on different bands as shown in FIG. 9. A gNB and the UE may communicate using a serving cell. A serving cell may be associated at least with one downlink CC (e.g., may be associated only with one downlink CC or may be associated with a downlink CC and an uplink CC). A serving cell may be a Primary Cell (PCell) or a Secondary cCell (SCell).

A UE may adjust the timing of its uplink transmissions using an uplink timing control procedure. A Timing Advance (TA) may be used to adjust the uplink frame timing relative to the downlink frame timing. The gNB may determine the desired Timing Advance setting and provides that to the UE. The UE may use the provided TA to determine its uplink transmit timing relative to the UE's observed downlink receive timing.

In the RRC Connected state, the gNB may be responsible for maintaining the timing advance to keep the L1 synchronized. Serving cells having uplink to which the same timing advance applies and using the same timing reference cell are grouped in a Timing Advance Group (TAG). A TAG may contain at least one serving cell with configured uplink. The mapping of a serving cell to a TAG may be configured by RRC. For the primary TAG, the UE may use the PCell as timing reference cell, except with shared spectrum channel access where an SCell may also be used as timing reference cell in certain cases. In a secondary TAG, the UE may use any of the activated SCells of this TAG as a timing reference cell and may not change it unless necessary.

Timing advance updates may be signaled by the gNB to the UE via MAC CE commands. Such commands may restart a TAG-specific timer which may indicate whether the L1 can be synchronized or not: when the timer is running, the L1 may be considered synchronized, otherwise, the L1 may be considered non-synchronized (in which case uplink transmission may only take place on PRACH).

A UE with single timing advance capability for CA may simultaneously receive and/or transmit on multiple CCs corresponding to multiple serving cells sharing the same timing advance (multiple serving cells grouped in one TAG). A UE with multiple timing advance capability for CA may simultaneously receive and/or transmit on multiple CCs corresponding to multiple serving cells with different timing advances (multiple serving cells grouped in multiple TAGs). The NG-RAN may ensure that each TAG contains at least one serving cell. A non-CA capable UE may receive on a single CC and may transmit on a single CC corresponding to one serving cell only (one serving cell in one TAG).

The multi-carrier nature of the physical layer in case of CA may be exposed to the MAC layer and one HARQ entity may be required per serving cell. When CA is configured, the UE may have one RRC connection with the network. At RRC connection establishment/re-establishment/handover, one serving cell (e.g., the PCell) may provide the NAS mobility information. Depending on UE capabilities, SCells may be configured to form together with the PCell a set of serving cells. The configured set of serving cells for a UE may consist of one PCell and one or more SCells. The reconfiguration, addition and removal of SCells may be performed by RRC.

In a dual connectivity scenario, a UE may be configured with a plurality of cells comprising a Master Cell Group (MCG) for communications with a master base station, a Secondary Cell Group (SCG) for communications with a secondary base station, and two MAC entities: one MAC entity and for the MCG for communications with the master base station and one MAC entity for the SCG for communications with the secondary base station.

Figure 10:
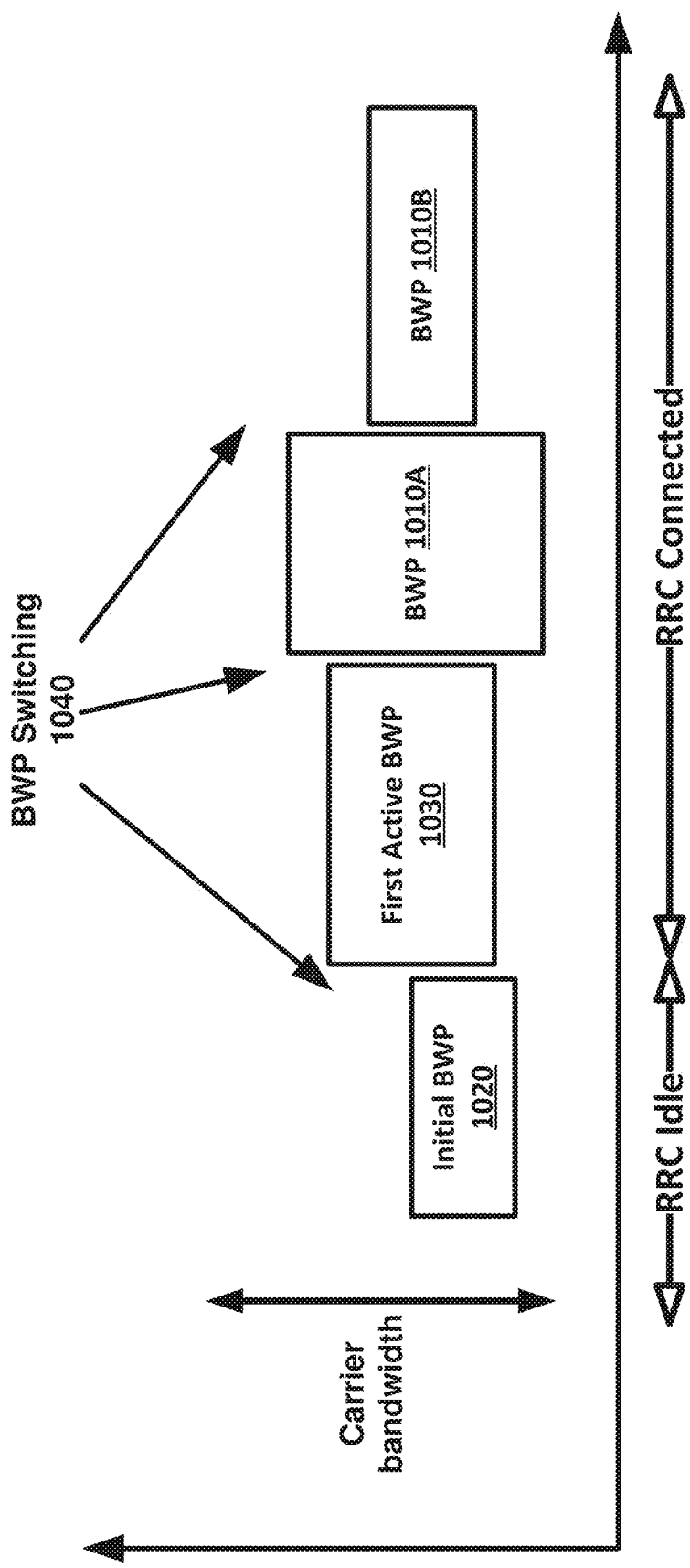
FIG. 10 shows example bandwidth part configuration and switching according to some aspects of some of various exemplary embodiments of the present disclosure.

FIG. 10 shows example bandwidth part configuration and switching according to some aspects of some of various exemplary embodiments of the present disclosure. The UE may be configured with one or more Bandwidth Parts (BWPs) 1010 on a given component carrier. In some examples, one of the one or more bandwidth parts may be active at a time. The active bandwidth part may define the UE's operating bandwidth within the cell's operating bandwidth. For initial access, and until the UE's configuration in a cell is received, initial bandwidth part 1020 determined from system information may be used. With Bandwidth Adaptation (BA), for example through BWP switching 1040, the receive and transmit bandwidth of a UE may not be as large as the bandwidth of the cell and may be adjusted. For example, the width may be ordered to change (e.g., to shrink during period of low activity to save power); the location may move in the frequency domain (e.g., to increase scheduling flexibility); and the subcarrier spacing may be ordered to change (e.g., to allow different services). The first active BWP 1020 may be the active BWP upon RRC (re-)configuration for a PCell or activation of an SCell.

For a downlink BWP or uplink BWP in a set of downlink BWPs or uplink BWPs, respectively, the UE may be provided the following configuration parameters: a Subcarrier Spacing (SCS); a cyclic prefix; a common RB and a number of contiguous RBs; an index in the set of downlink BWPs or uplink BWPs by respective BWP-Id; a set of BWP-common and a set of BWP-dedicated parameters. A BWP may be associated with an OFDM numerology according to the configured subcarrier spacing and cyclic prefix for the BWP. For a serving cell, a UE may be provided by a default downlink BWP among the configured downlink BWPs. If a UE is not provided a default downlink BWP, the default downlink BWP may be the initial downlink BWP.

A downlink BWP may be associated with a BWP inactivity timer. If the BWP inactivity timer associated with the active downlink BWP expires and if the default downlink BWP is configured, the UE may perform BWP switching to the default BWP. If the BWP inactivity timer associated with the active downlink BWP expires and if the default downlink BWP is not configured, the UE may perform BWP switching to the initial downlink BWP.

Figure 11:
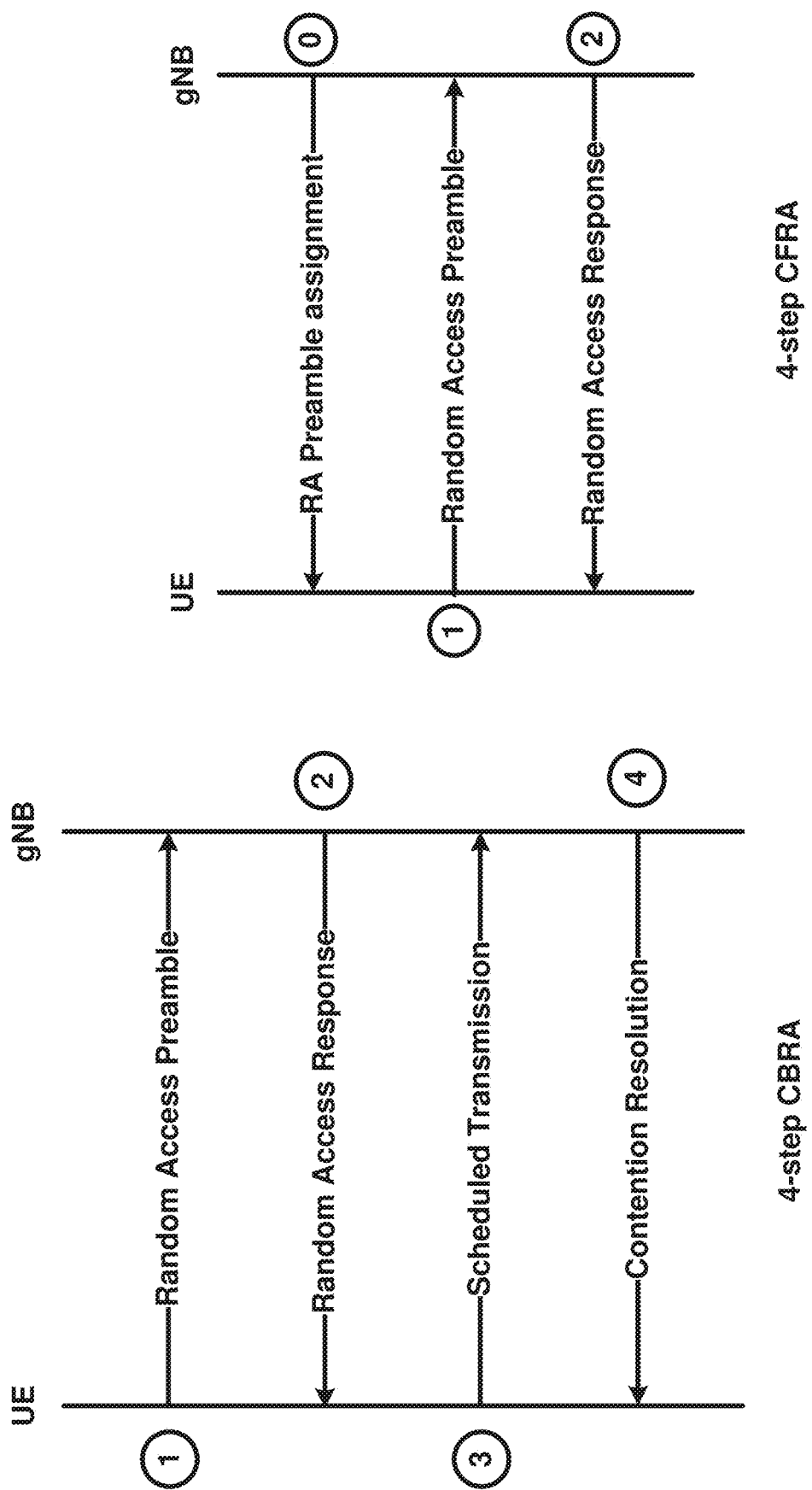
FIG. 11 shows example four-step contention-based and contention-free random access processes according to some aspects of some of various exemplary embodiments of the present disclosure.
Figure 12:
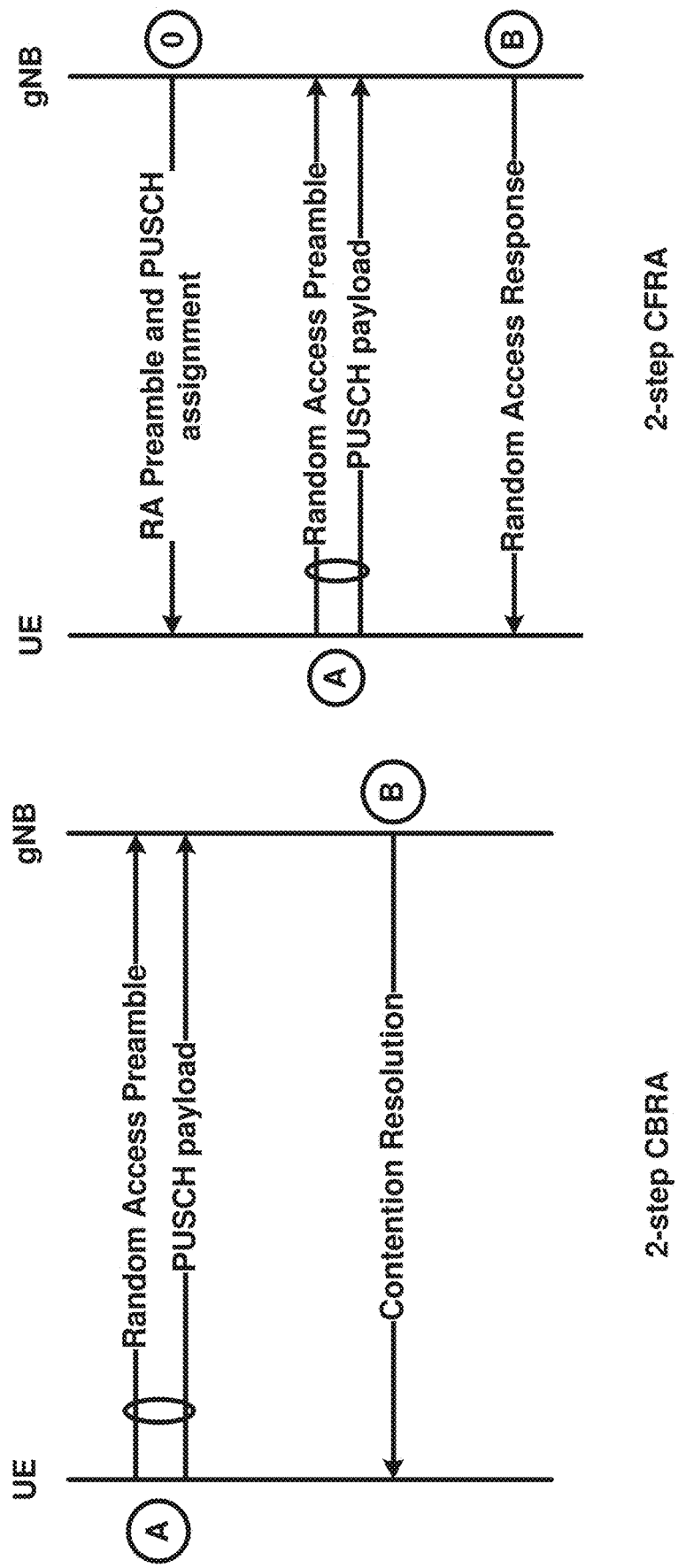
FIG. 12 shows example two-step contention-based and contention-free random access processes according to some aspects of some of various exemplary embodiments of the present disclosure.

FIG. 11 shows example four-step contention-based and contention-free random access processes according to some aspects of some of various exemplary embodiments of the present disclosure. FIG. 12 shows example two-step contention-based and contention-free random access processes according to some aspects of some of various exemplary embodiments of the present disclosure. The random access procedure may be triggered by a number of events, for example: Initial access from RRC Idle State; RRC Connection Re-establishment procedure; downlink or uplink data arrival during RRC Connected State when uplink synchronization status is "non-synchronized"; uplink data arrival during RRC Connected State when there are no PUCCH resources for Scheduling Request (SR) available; SR failure; Request by RRC upon synchronous reconfiguration (e.g. handover); Transition from RRC Inactive State; to establish time alignment for a secondary TAG; Request for Other System Information (SI); Beam Failure Recovery (BFR); Consistent uplink Listen-Before-Talk (LBT) failure on PCell.

Two types of Random Access (RA) procedure may be supported: 4-step RA type with MSG1 and 2-step RA type with MSGA. Both types of RA procedure may support Contention-Based Random Access (CBRA) and Contention-Free Random Access (CFRA) as shown in FIG. 11 and FIG. 12.

The UE may select the type of random access at initiation of the random access procedure based on network configuration. When CFRA resources are not configured, a RSRP threshold may be used by the UE to select between 2-step RA type and 4-step RA type. When CFRA resources for 4-step RA type are configured, UE may perform random access with 4-step RA type. When CFRA resources for 2-step RA type are configured, UE may perform random access with 2-step RA type.

The MSG1 of the 4-step RA type may consist of a preamble on PRACH. After MSG1 transmission, the UE may monitor for a response from the network within a configured window. For CFRA, dedicated preamble for MSG1 transmission may be assigned by the network and upon receiving Random Access Response (RAR) from the network, the UE may end the random access procedure as shown in FIG. 11. For CBRA, upon reception of the random access response, the UE may send MSG3 using the uplink grant scheduled in the random access response and may monitor contention resolution as shown in FIG. 11. If contention resolution is not successful after MSG3 (re) transmission(s), the UE may go back to MSG1 transmission.

The MSGA of the 2-step RA type may include a preamble on PRACH and a payload on PUSCH. After MSGA transmission, the UE may monitor for a response from the network within a configured window. For CFRA, dedicated preamble and PUSCH resource may be configured for MSGA transmission and upon receiving the network response, the UE may end the random access procedure as shown in FIG. 12. For CBRA, if contention resolution is successful upon receiving the network response, the UE may end the random access procedure as shown in FIG. 12; while if fallback indication is received in MSGB, the UE may perform MSG3 transmission using the uplink grant scheduled in the fallback indication and may monitor contention resolution. If contention resolution is not successful after MSG3 (re)transmission(s), the UE may go back to MSGA transmission.

Figure 13:
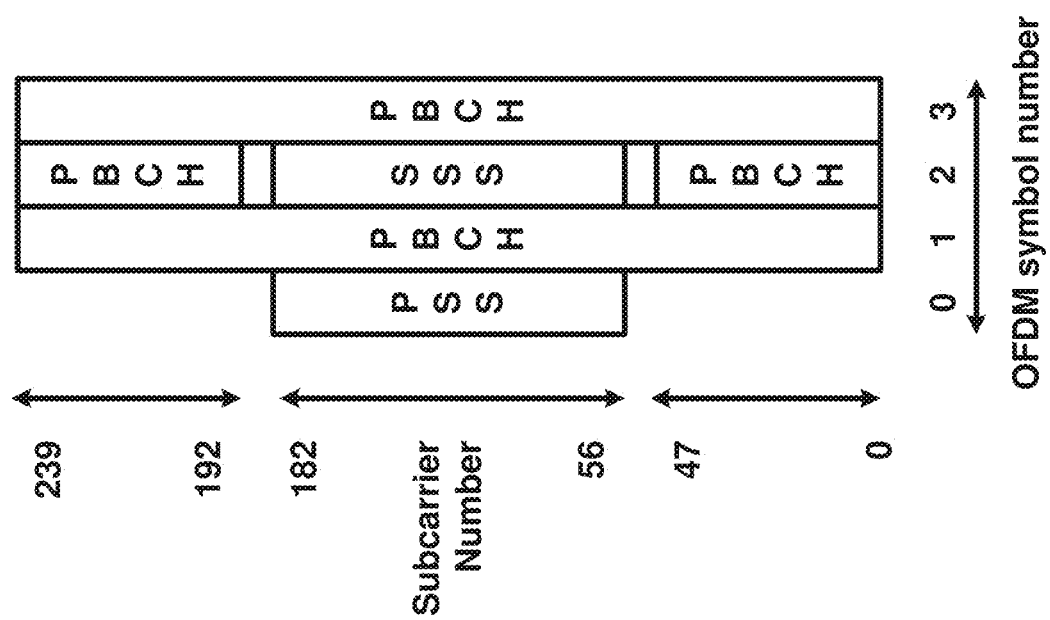
FIG. 13 shows example time and frequency structure of Synchronization Signal and Physical Broadcast Channel (PBCH) Block (SSB) according to some aspects of some of various exemplary embodiments of the present disclosure.

FIG. 13 shows example time and frequency structure of Synchronization Signal and Physical Broadcast Channel (PBCH) Block (SSB) according to some aspects of some of various exemplary embodiments of the present disclosure. The SS/PBCH Block (SSB) may consist of Primary and Secondary Synchronization Signals (PSS, SSS), each occupying 1 symbol and 127 subcarriers (e.g., subcarrier numbers 56 to 182 in FIG. 13), and PBCH spanning across 3 OFDM symbols and 240 subcarriers, but on one symbol leaving an unused part in the middle for SSS as show in FIG. 13. The possible time locations of SSBs within a half-frame may be determined by sub-carrier spacing and the periodicity of the half-frames, where SSBs are transmitted, may be configured by the network. During a half-frame, different SSBs may be transmitted in different spatial directions (i.e., using different beams, spanning the coverage area of a cell).

The PBCH may be used to carry Master Information Block (MIB) used by a UE during cell search and initial access procedures. The UE may first decode PBCH/MIB to receive other system information. The MIB may provide the UE with parameters required to acquire System Information Block 1 (SIB1), more specifically, information required for monitoring of PDCCH for scheduling PDSCH that carries SIB1. In addition, MIB may indicate cell barred status information. The MIB and SIB1 may be collectively referred to as the minimum system information (SI) and SIB1 may be referred to as remaining minimum system information (RMSI). The other system information blocks (SIBs) (e.g., SIB2, SIB3, . . . , SIB10 and SIBpos) may be referred to as Other SI. The Other SI may be periodically broadcast on DL-SCH, broadcast on-demand on DL-SCH (e.g., upon request from UEs in RRC Idle State, RRC Inactive State, or RRC connected State), or sent in a dedicated manner on DL-SCH to UEs in RRC Connected State (e.g., upon request, if configured by the network, from UEs in RRC Connected State or when the UE has an active BWP with no common search space configured).

Figure 14:
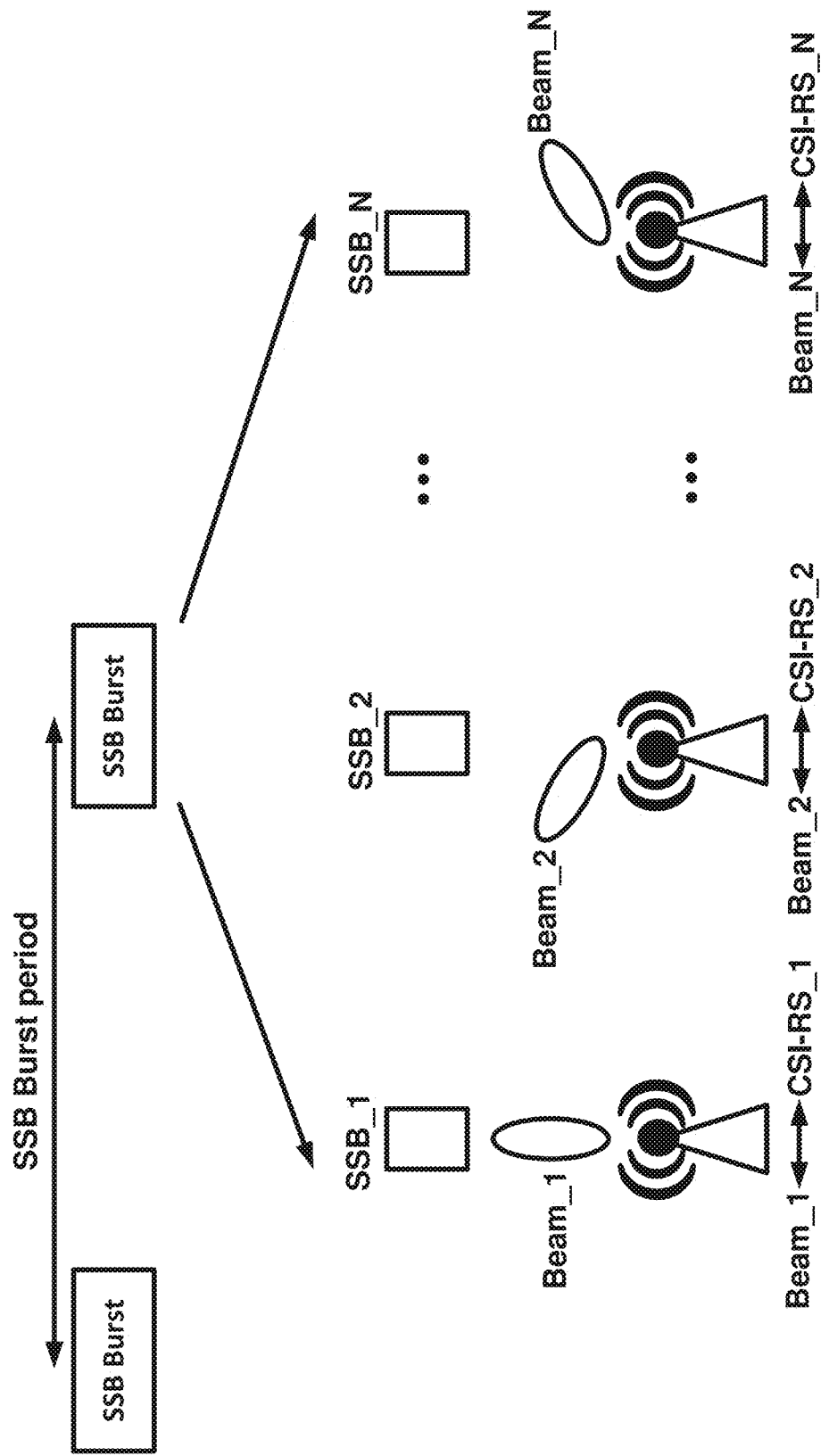
FIG. 14 shows example SSB burst transmissions according to some aspects of some of various exemplary embodiments of the present disclosure.

FIG. 14 shows example SSB burst transmissions according to some aspects of some of various exemplary embodiments of the present disclosure. An SSB burst may include N SSBs and each SSB of the N SSBs may correspond to a beam. The SSB bursts may be transmitted according to a periodicity (e.g., SSB burst period). During a contention-based random access process, a UE may perform a random access resource selection process, wherein the UE first selects an SSB before selecting a RA preamble. The UE may select an SSB with an RSRP above a configured threshold value. In some embodiments, the UE may select any SSB if no SSB with RSRP above the configured threshold is available. A set of random access preambles may be associated with an SSB. After selecting an SSB, the UE may select a random access preamble from the set of random access preambles associated with the SSB and may transmit the selected random access preamble to start the random access process.

In some embodiments, a beam of the N beams may be associated with a CSI-RS resource. A UE may measure CSI-RS resources and may select a CSI-RS with RSRP above a configured threshold value. The UE may select a random access preamble corresponding to the selected CSI-RS and may transmit the selected random access process to start the random access process. If there is no random access preamble associated with the selected CSI-RS, the UE may select a random access preamble corresponding to an SSB which is Quasi-Collocated with the selected CSI-RS.

In some embodiments, based on the UE measurements of the CSI-RS resources and the UE CSI reporting, the base station may determine a Transmission Configuration Indication (TCI) state and may indicate the TCI state to the UE, wherein the UE may use the indicated TCI state for reception of downlink control information (e.g., via PDCCH) or data (e.g., via PDSCH). The UE may use the indicated TCI state for using the appropriate beam for reception of data or control information. The indication of the TCI states may be using RRC configuration or in combination of RRC signaling and dynamic signaling (e.g., via a MAC Control element (MAC CE) and/or based on a value of field in the downlink control information that schedules the downlink transmission). The TCI state may indicate a Quasi-Colocation (QCL) relationship between a downlink reference signal such as CSI-RS and the DM-RS associated with the downlink control or data channels (e.g., PDCCH or PDSCH, respectively).

In some embodiments, the UE may be configured with a list of up to M TCI-State configurations, using Physical Downlink Shared Channel (PDSCH) configuration parameters, to decode PDSCH according to a detected PDCCH with DCI intended for the UE and the given serving cell, where M may depends on the UE capability. Each TCI-State may contain parameters for configuring a QCL relationship between one or two downlink reference signals and the DM-RS ports of the PDSCH, the DM-RS port of PDCCH or the CSI-RS port(s) of a CSI-RS resource. The quasi co-location relationship may be configured by one or more RRC parameters. The quasi co-location types corresponding to each DL RS may take one of the following values: 'QCL-TypeA': {Doppler shift, Doppler spread, average delay, delay spread}; 'QCL-TypeB': {Doppler shift, Doppler spread}; 'QCL-TypeC': {Doppler shift, average delay}; 'QCL-TypeD': {Spatial Rx parameter}. The UE may receive an activation command (e.g., a MAC CE), used to map TCI states to the codepoints of a DCI field.

Figure 15:
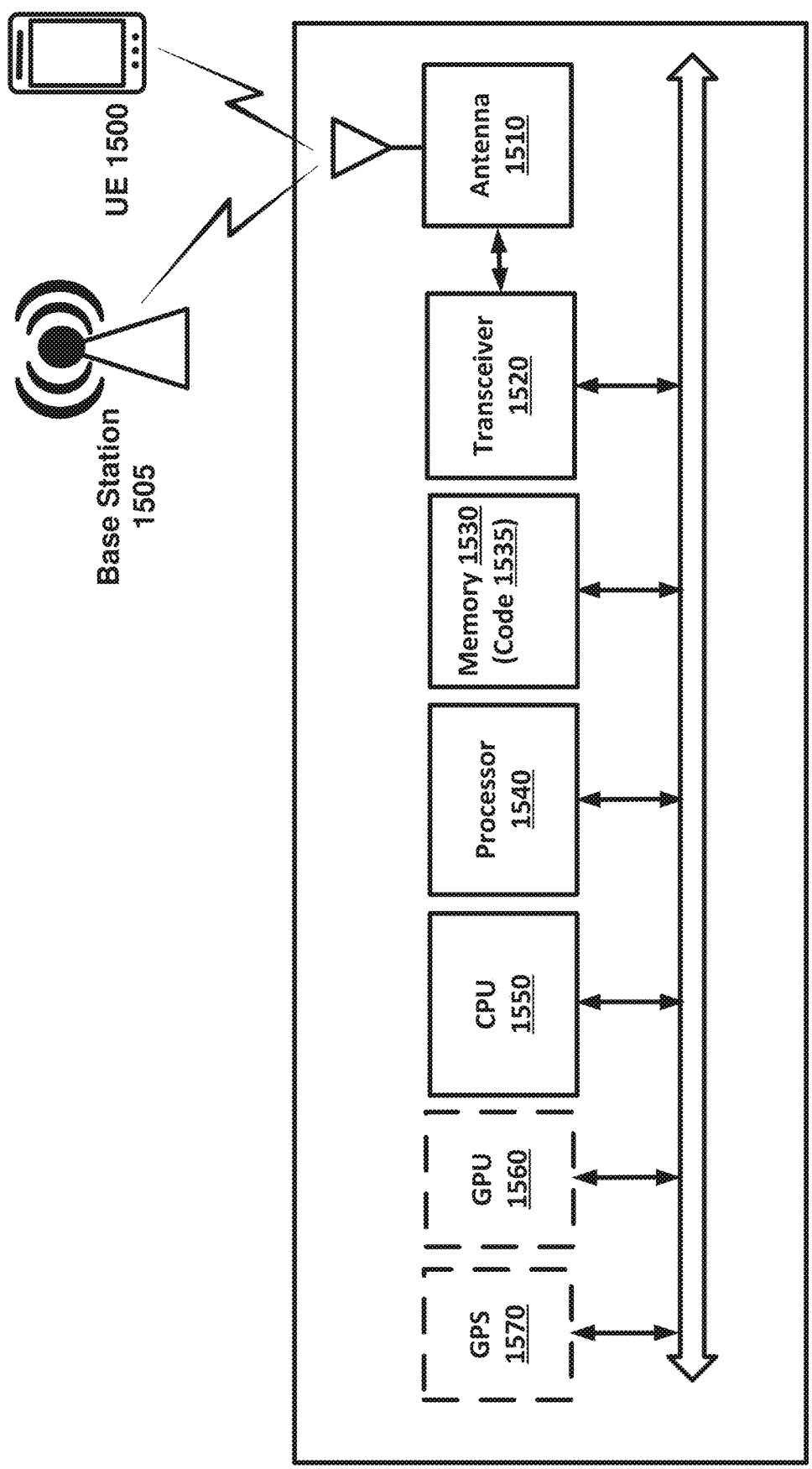
FIG. 15 shows example components of a user equipment and a base station for transmission and/or reception according to some aspects of some of various exemplary embodiments of the present disclosure.

FIG. 15 shows example components of a user equipment and a base station for transmission and/or reception according to some aspects of some of various exemplary embodiments of the present disclosure. All or a subset of blocks and functions in FIG. 15 may be in the base station 1505 and the user equipment 1500 and may be performed by the user equipment 1500 and by the base station 1505. The Antenna 1510 may be used for transmission or reception of electromagnetic signals. The Antenna 1510 may comprise one or more antenna elements and may enable different input-output antenna configurations including Multiple-Input Multiple Output (MIMO) configuration, Multiple-Input Single-Output (MISO) configuration and Single-Input Multiple-Output (SIMO) configuration. In some embodiments, the Antenna 150 may enable a massive MIMO configuration with tens or hundreds of antenna elements. The Antenna 1510 may enable other multi-antenna techniques such as beamforming. In some examples and depending on the UE 1500 capabilities or the type of UE 1500 (e.g., a low-complexity UE), the UE 1500 may support a single antenna only.

The transceiver 1520 may communicate bi-directionally, via the Antenna 1510, wireless links as described herein. For example, the transceiver 1520 may represent a wireless transceiver at the UE and may communicate bi-directionally with the wireless transceiver at the base station or vice versa. The transceiver 1520 may include a modem to modulate the packets and provide the modulated packets to the Antennas 1510 for transmission, and to demodulate packets received from the Antennas 1510.

The memory 1530 may include RAM and ROM. The memory 1530 may store computer-readable, computer-executable code 1535 including instructions that, when executed, cause the processor to perform various functions described herein. In some examples, the memory 1530 may contain, among other things, a Basic Input/output System (BIOS) which may control basic hardware or software operation such as the interaction with peripheral components or devices.

The processor 1540 may include a hardware device with processing capability (e.g., a general purpose processor, a DSP, a CPU, a microcontroller, an ASIC, an FPGA, a programmable logic device, a discrete gate or transistor logic component, a discrete hardware component, or any combination thereof). In some examples, the processor 1540 may be configured to operate a memory using a memory controller. In other examples, a memory controller may be integrated into the processor 1540. The processor 1540 may be configured to execute computer-readable instructions stored in a memory (e.g., the memory 1530) to cause the UE 1500 or the base station 1505 to perform various functions.

The Central Processing Unit (CPU) 1550 may perform basic arithmetic, logic, controlling, and Input/output (I/O) operations specified by the computer instructions in the Memory 1530. The user equipment 1500 and/or the base station 1505 may include additional peripheral components such as a graphics processing unit (GPU) 1560 and a Global Positioning System (GPS) 1570. The GPU 1560 is a specialized circuitry for rapid manipulation and altering of the Memory 1530 for accelerating the processing performance of the user equipment 1500 and/or the base station 1505. The GPS 1570 may be used for enabling location-based services or other services for example based on geographical position of the user equipment 1500.

In some examples, semi-Persistent Scheduling (SPS) may be configured by RRC for a Serving Cell per BWP. Multiple assignments can be active simultaneously in the same BWP. Activation and deactivation of the DL SPS may be independent among the Serving Cells.

In some examples, for the DL SPS, a DL assignment may be provided by PDCCH, and stored or cleared based on L1 signaling indicating SPS activation or deactivation.

In some examples, RRC may configure the following parameters when the SPS is configured: cs-RNTI: CS-RNTI for activation, deactivation, and retransmission; nrofHARQ-Processes: the number of configured HARQ processes for SPS; harq-ProcID-Offset: Offset of HARQ process for SPS; periodicity: periodicity of configured downlink assignment for SPS.

In some examples, when the SPS is released by upper layers, the corresponding configurations may be released.

In some examples, after a downlink assignment is configured for SPS, the MAC entity may consider sequentially that the Nth downlink assignment occurs in the slot for which:

(numberOfSlotsPerFrame×SFN+slot number in the frame)=[(numberOfSlotsPerFrame×SFNstart time+slotstart time)+$N$×periodicity×numberOfSlotsPerFrame/10]modulo(1024×numberOfSlotsPerFrame)

where SFNstart time and slotstart time may be the SFN and slot, respectively, of the first transmission of PDSCH where the configured downlink assignment was (re-)initialized.

In some examples, paging may enable the network to reach UEs in RRC_IDLE and in RRC_INACTIVE state through Paging messages, and to notify UEs in RRC_IDLE, RRC_INACTIVE and RRC_CONNECTED state of system information change and ETWS/CMAS indications through Short Messages. Both Paging messages and Short Messages may be addressed with P-RNTI on PDCCH, but while the former may be sent on PCCH, the latter may be sent over PDCCH directly.

In some examples, while in RRC_IDLE the UE may monitor the paging channels for CN-initiated paging. In some examples, in RRC_INACTIVE the UE may monitor paging channels for RAN-initiated paging. In some examples, a UE may not monitor paging channels continuously. Paging DRX may be defined where the UE in RRC_IDLE or RRC_INACTIVE may be required to monitor paging channels during one Paging Occasion (PO) per DRX cycle. The Paging DRX cycles may be configured by the network: 1) For CN-initiated paging, a default cycle may be broadcast in system information; 2) For CN-initiated paging, a UE specific cycle may be configured via NAS signaling; 3) For RAN-initiated paging, a UE-specific cycle may be configured via RRC signaling. The UE may use the shortest of the DRX cycles applicable i.e., a UE in RRC_IDLE may use the shortest of the first two cycles above, while a UE in RRC_INACTIVE may use the shortest of the three.

In some examples, the POs of a UE for CN-initiated and RAN-initiated paging may be based on the same UE ID, resulting in overlapping POs for both. The number of different POs in a DRX cycle may be configurable via system information and a network may distribute UEs to those POs based on their IDs.

In some examples, when in RRC_CONNECTED, the UE may monitor the paging channels in any PO signaled in system information for SI change indication and PWS notification. In case of bandwidth adaptation (BA), a UE in RRC_CONNECTED may monitor paging channels on the active BWP with common search space configured.

In some examples, for operation with shared spectrum channel access, a UE may be configured for an additional number of PDCCH monitoring occasions in its PO to monitor for paging. When the UE detects a PDCCH transmission within the UE's PO addressed with P-RNTI, the UE may not monitor the subsequent PDCCH monitoring occasions within this PO.

In some examples a paging procedure may be used to transmit paging information to a UE in RRC_IDLE or RRC_INACTIVE. The network may initiate the paging procedure by transmitting the Paging message at the UE's paging occasion. The network may address multiple UEs within a Paging message by including one PagingRecord for each UE.

In some examples, upon receiving the Paging message, if in RRC_IDLE, for each of the PagingRecord, if any, included in the Paging message: if the ue-Identity included in the PagingRecord matches the UE identity allocated by upper layers: the UE may forward the ue-Identity and accessType (if present) to the upper layers.

In some examples, upon receiving the Paging message, if in RRC_INACTIVE, for each of the PagingRecord, if any, included in the Paging message: if the UE is configured by upper layers with Access Identity 1: the UE may initiate the RRC connection resumption procedure with resumeCause set to mps-PriorityAccess; otherwise if the UE is configured by upper layers with Access Identity 2: the UE may initiate the RRC connection resumption procedure with resume- Cause set to mcs-PriorityAccess; otherwise if the UE is configured by upper layers with one or more Access Identities equal to 11-15: initiate the RRC connection resumption procedure with resumeCause set to highPriorityAccess. Otherwise, the UE may initiate the RRC connection resumption procedure with resumeCause set to mt-Access. In some examples, if the ue-Identity included in the PagingRecord matches the UE identity allocated by upper layers: the UE may forward the ue-Identity to upper layers and accessType (if present) to the upper layers.

In some examples, Short Messages can be transmitted on PDCCH using P-RNTI with or without associated Paging message using Short Message field in DCI format 1_0.

In some examples, the UE may use Discontinuous Reception (DRX) in RRC_IDLE and RRC_INACTIVE state in order to reduce power consumption. The UE may monitor one paging occasion (PO) per DRX cycle. A PO may be a set of PDCCH monitoring occasions and may consist of multiple time slots (e.g., subframe or OFDM symbol) where paging DCI may be sent. One Paging Frame (PF) may be one Radio Frame and may contain one or multiple PO(s) or starting point of a PO.

In some examples in multi-beam operations, the UE may assume that the same paging message and the same Short Message are repeated in transmitted beams and thus the selection of the beam(s) for the reception of the paging message and Short Message may be up to UE implementation. The paging message may be same for both RAN initiated paging and CN initiated paging.

In some examples, the UE may initiate RRC Connection Resume procedure upon receiving RAN initiated paging. If the UE receives a CN initiated paging in RRC_INACTIVE state, the UE may move to RRC_IDLE and informs NAS.

The PF and PO for paging may be determined by the following formulae: SFN for the PF is determined by: (SFN+PF_offset) mod T=(T div N)*(UE_ID mod N). Index (i_s), indicating the index of the PO may be determined by: i_s=floor (UE_ID/N) mod Ns.

The PDCCH monitoring occasions for paging may be determined according to pagingSearchSpace and firstPDCCH-MonitoringOccasionOfPO and nrofPDCCH-MonitoringOccasionPerSSB-InPO if configured. When SearchSpaceId=0 is configured for pagingSearchSpace, the PDCCH monitoring occasions for paging may be same as for RMSI.

In some examples, when SearchSpaceId=0 is configured for pagingSearchSpace, Ns may be either 1 or 2. For Ns=1, there may be one PO which may start from the first PDCCH monitoring occasion for paging in the PF. For Ns=2, PO may be either in the first half frame (i_s=0) or the second half frame (i_s=1) of the PF.

When SearchSpaceId other than 0 is configured for pagingSearchSpace, the UE may monitor the (i_s+1)th PO. A PO may be a set of 'S*X' consecutive PDCCH monitoring occasions where 'S' is the number of actual transmitted SSBs determined according to ssb-PositionsInBurst in SIB1 and X may be the nrofPDCCH-MonitoringOccasion-PerSSB-InPO if configured or may be equal to 1 otherwise. The [x*S+K]th PDCCH monitoring occasion for paging in the PO may correspond to the Kth transmitted SSB, where x=0, 1, . . . , X−1, K=1, 2, . . . , S. The PDCCH monitoring occasions for paging which do not overlap with UL symbols (determined according to tdd-UL-DL-ConfigurationCommon) may be sequentially numbered from zero starting from the first PDCCH monitoring occasion for paging in the PF. When firstPDCCH-MonitoringOccasionOfPO is present, the starting PDCCH monitoring occasion number of (i_s+1)th PO is the (i_s+1)th value of the firstPDCCH-MonitoringOccasionOfPO parameter; otherwise, it may be equal to i_s*S*X. If X>1, when the UE detects a PDCCH transmission addressed to P-RNTI within its PO, the UE may not be required to monitor the subsequent PDCCH monitoring occasions for this PO.

In some examples, a PO associated with a PF may start in the PF or after the PF.

In some examples, the PDCCH monitoring occasions for a PO may span multiple radio frames. When SearchSpaceId other than 0 is configured for paging-SearchSpace the PDCCH monitoring occasions for a PO may span multiple periods of the paging search space.

The following parameters are used for the calculation of PF and i_s above: T: DRX cycle of the UE (T may be determined by the shortest of the UE specific DRX value(s), if configured by RRC and/or upper layers, and a default DRX value broadcast in system information. In RRC_IDLE state, if UE specific DRX is not configured by upper layers, the default value may be applied); N: number of total paging frames in T. Ns: number of paging occasions for a PF; PF_offset: offset used for PF determination; UE_ID: 5G-S-TMSI mod 1024.

In some examples, parameters Ns, nAndPagingFrameOffset, nrofPDCCH-MonitoringOccasionPerSSB-InPO, and the length of default DRX Cycle may be signaled in SIB1. The values of N and PF_offset may be derived from the parameter nAndPagingFrameOffset. The parameter firstPDCCH-MonitoringOccasionOfPO may be signaled in SIB1 for paging in initial DL BWP. For paging in a DL BWP other than the initial DL BWP, the parameter first-PDCCH-MonitoringOccasionOfPO may be signaled in the corresponding BWP configuration.

In some examples if the UE has no 5G-S-TMSI, for instance when the UE has not yet registered onto the network, the UE may use as default identity UE_ID=0 in the PF and i_s formulas above.

In some examples, 5G-S-TMSI may be a 48 bit long bit string. 5G-S-TMSI may in the formulae above be interpreted as a binary number where the left most bit represents the most significant bit.

In some examples, the RRCRelease message may be used to command the release of an RRC connection or the suspension of the RRC connection. A field/IE suspendConfig may indicate configuration for the RRC_INACTIVE state. The network may not configure suspendConfig when the network redirect the UE to an inter-RAT carrier frequency or if the UE is configured with a DAPS bearer. The suspendConfig field/IE may comprise a fullI-RNTI parameter, a shortI-RNTI parameter, a ran-PagingCycle parameter, a ran-NotificationAreaInfo parameter, a t380 timer parameter and a nextHopChainingCount parameter. Network may ensure that the UE in RRC_INACTIVE always has a valid ran-NotificationAreaInfo. A ran-PagingCycle parameter may refer to the UE specific cycle for RAN-initiated paging. A t380 parameter may refer to the timer that triggers the periodic RNAU procedure in UE.

In some examples, broadcast/multicast services may be used to enable general MBS services over 5GS. The use cases that could benefit from this feature include public safety and mission critical, V2X applications, IPTV, live video, software delivery over wireless and IoT applications, etc. A delivery mode 1 (e.g., only for multicast) capable of addressing higher QoS services and a delivery mode 2 (e.g., only for broadcast) focusing on lower QoS services may be used. Example embodiments may enable optimizing the deployment of MBS, such as improvement of resource efficiency and capacity.

In some examples, Mission Critical Services, especially for cells with a large number of UEs may operate in RRC_INACTIVE state. In some examples, keeping UEs in RRC_CONNECTED state may not be power efficient. It may be more efficient to support multicast for UEs in RRC_INACTIVE. Example embodiments may enable multicast reception by UEs in RRC_INACTIVE state. Example embodiments may enable PTM configuration for UEs receiving multicast in RRC_INACTIVE state.

In some examples, MO-SDT may allow small packet transmission for UL-oriented packets. For DL, mobile terminated small data transmission (MT-SDT) (e.g., DL-triggered small data) may enable reducing signaling overhead and UE power consumption by not transitioning to RRC_CONNECTED and reducing latency by allowing fast transmission of (small and infrequent) packets, e.g., for positioning.

In some examples, for paging-triggered SDT (MT-SDT), MT-SDT triggering mechanism for UEs in RRC_INACTIVE may be supported and RA-SDT and CG-SDT may be used as the UL response. In some examples, MT-SDT procedure for initial DL data reception and subsequent UL/DL data transmissions in RRC_INACTIVE may be used.

In some examples, with growing use of smart phone applications and IoT devices, there are more use cases in which UEs' may receive or transmit small data packets sporadically. In some cases, the data may be transmitted in a small single packet in one direction while in others the data exchange may involve few small packet transmissions separated in time. In many of such Small Data Transmission (SDT) use cases transitioning the UEs to RRC connected state may be inefficient and may cause unnecessary latency, power consumption and signaling overhead especially in scenarios involving many user devices, such as IoT.

In some examples, Mobile Originated Small Data Transmission MO-SDT may allow small packet transmission for UL-oriented packets from UEs in inactive state without moving to RRC connected state. In some examples, the MO-SDT in uplink may utilize random access (RA) based and configured grant (CG) based transmission from UEs allowing one or multiple transmissions in UL.

Mobile Terminated MT-SDT (i.e., DL-triggered small data) may allow reducing signaling overhead and UE power consumption by not transitioning to RRC_CONNECTED and reducing latency by allowing fast transmission of (small and infrequent) packets, e.g., for positioning.

In some examples, multicasting may be used for UEs in RRC Inactive state.

In some examples, an SDT session may involve a single or multiple small data packet transmissions in one or both directions.

In some MT-SDT use cases the same downlink data may be targeted toward multiple UEs. In such cases and when the number of the target UEs is large, e.g., in some IoT applications, the downlink SDT may be sent more efficiently as multicast. In this case many such target UEs who may be in inactive state may receive the multicast SDT without transitioning to RRC Connected state. In some examples, the target UEs which are already in RRC connected state may receive the same multicast SDT.

In some examples, SDT framework may allow multicasting of small data packets to UEs in inactive states.

In some examples, the multicast SDT may be received by a mix of UEs in RRC Connected and Inactive state.

Figure 16:
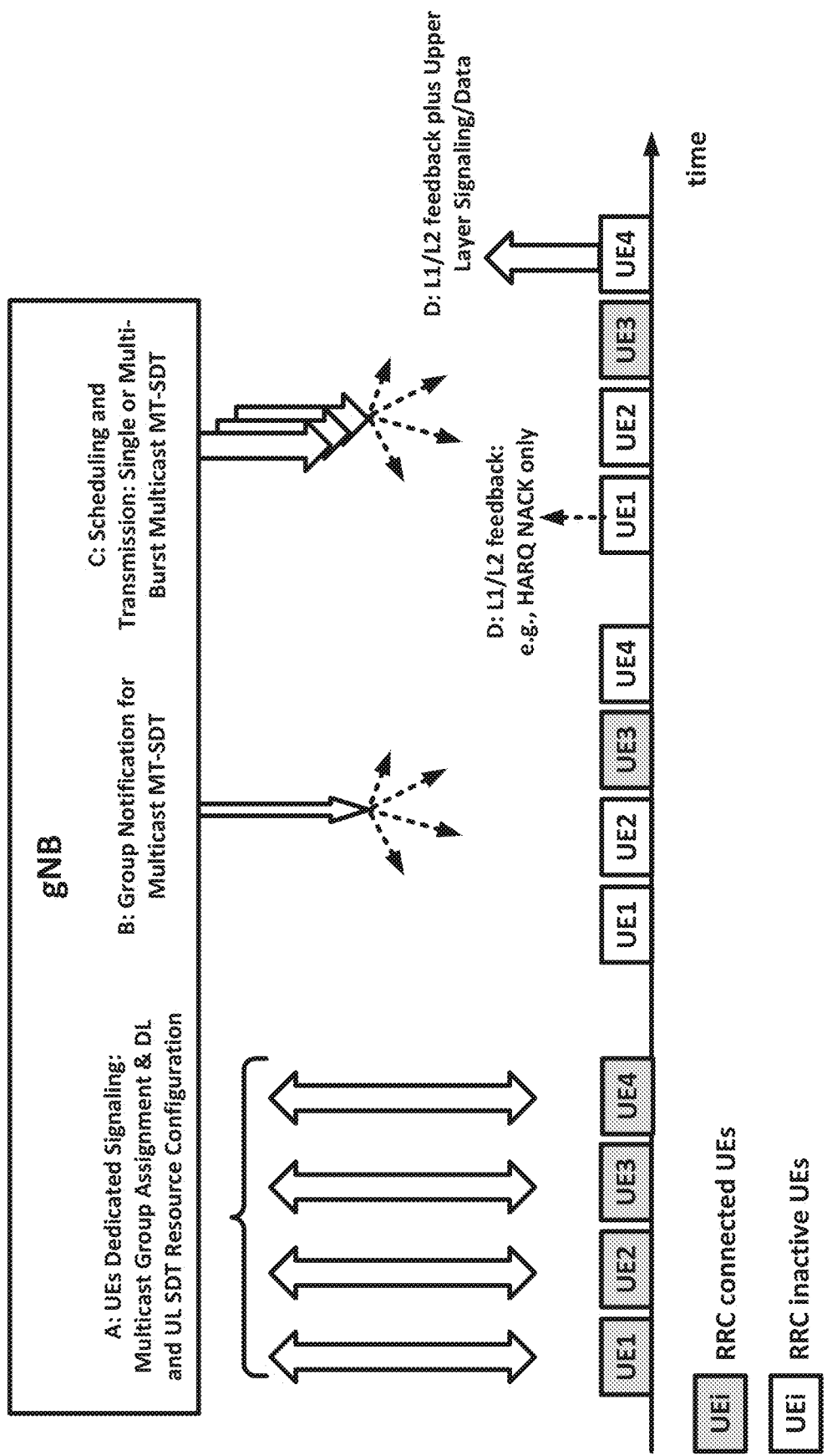
FIG. 16 shows example multicast SDT processes including: configuration, notification, scheduling, and uplink feedback according to some aspects of some of various exemplary embodiments of the present disclosure.

An example of signaling process and steps for MT-SDT resource configurations, notification and data transmission for multicasting is illustrated in FIG. 16.

In some examples as shown in FIG. 16, Step A for multicasting in MT-SDT may be SDT configuration. The UEs may join a multicast SDT group through dedicated signaling while in RRC connected state. Such exchange may also include resource configuration for group multicast ID to be used for group notification and multicast SDT scheduling in downlink as well as resources to be used for associated SDT in uplink, in steps C and D. In some use cases, e.g., IoT applications, the UEs may be preconfigured with multicast group identifiers and SDT parameters.

In some examples, multicast SDT parameters including group ID and resource configuration for downlink scheduling, e.g., multicast default BWP/CORESET and G-RNTI/G-CS-RNTI, may be preconfigured or provided to UE through dedicated signaling when UE is in RRC connected state.

In some examples, SDT configuration signaling and adding a UE to a multicast group may be initiated by a request by the UE or pushed by the network.

In some examples as shown in FIG. 16, Step B for multicasting in MT-SDT may be MT-SDT Group Notification. The common group paging and notification signaling may be used to inform UEs about the start of a Multicast SDT session. Such notification may use a common multicast identifier for paging target UEs and may be sent once the UEs within the multicast group have been configured with SDT related parameters.

In some examples, multicast MT-SDT may reuse common RAN level paging mechanism of MBS to notify UEs about upcoming SDT session.

In some examples, the RRC Connected UEs may receive the notification about upcoming multicast SDT through dedicated signaling or may be configured as to monitor and receive the same common RAN level paging as used for Inactive UEs.

In some examples as shown in FIG. 16, Step C for multicasting in MT-SDT may be Scheduling and Transmission. The Multicast SDT in downlink may use Dynamic or Configured/SPS scheduling. The SDT configuration may include a group RNTI, e.g., G-RNTI or G-CS-RNTI, to be used by UEs to monitor PDCCH and downlink scheduling. Such PDCCH may use the UEs' default BWP or an SDT specific BWP/CORESET common to all UEs in the group.

In some examples, the DL scheduling of multicast SDT may use configured or dynamic scheduling using G-RNTI or GS-RNTI provided to UEs as part of SDT configuration.

In some examples, UEs involved in multicast SDT may be configured to monitor a common CORESET to receive PDCCHs carrying multicast notification, scheduling and data.

In some examples as shown in FIG. 16, Step D for multicasting in MT-SDT may be Uplink Replies and Feedback for Multicast SDT. Some multicast SDT use cases, may require L1/L2 feedback for confirmation of delivery or channel feedback and some may need higher layer reply signaling or application layer data from target UEs.

In some examples, certain use cases of MT-SDT may require some form of L1/L2 feedback and/or higher layer reply signaling/data from the target UEs.

In some examples, the (multicast) MT-SDT configuration signaling may include conditions, resource information and parameters to be used by UEs for their uplink replies and feedback to downlink data.

In some examples, the UEs in RRC connected state may transmit such feedback/replies using their configured PUCCH and dynamically and configured uplink grants on PUSCH. For Inactive UEs, the MO-SDT framework may define some conditions on maximum payload size and minimum RSRP or TAT non-expiry, for SDT to be used in uplink. The reply/feedback uplink transmissions to MT-SDT from Inactive UEs may also need to be qualified as SDT by UE to be sent without transitioning to RRC Connected state. The SDT transmission in the uplink may be allowed to use Random Access (RA) of Configured Grant (CG) resources.

In some examples, replies or feedback from UEs to a downlink MT-SDT may be sent without transitioning to Connected state if RRC configured conditions for uplink SDT, e.g., min RSRP and maximum payload size, are met. Otherwise, such UEs may transition to RRC connected to send such uplink signaling/data.

In some examples, the upper later replies to downlink SDT in Step D, if required and sent as uplink SDT, may use RA based or CG based uplink transmission according to initial SDT configuration set by the gNB.

In some examples, the configuration of multicast MT-SDT in Step A, may include parameter related to conditions and resources for uplink SDT which may be RA and/or CG based.

In some examples, for cases where only uplink L1/L2 feedback to multicast SDT, e.g., HARQ ACK/NAK or CSI feedback, may be needed the UEs may be configured as part of SDT configuration in Step A, with PRACH/PUCCH resources to be used for such transmissions.

In certain use cases of small data transmission (SDT) during the RRC inactive cases, for examples Mission Critical and/or IoT devices with a large number of devices, unicast data transmission may be inefficient. There is a need to enhance SDT data transmission (e.g., MT-SDT data) during the RRC inactive state. Example embodiments enhance the processes for SDT data transmission during the RRC inactive state by enabling multicast SDT data transmission during the RRC inactive state.

Figure 17:
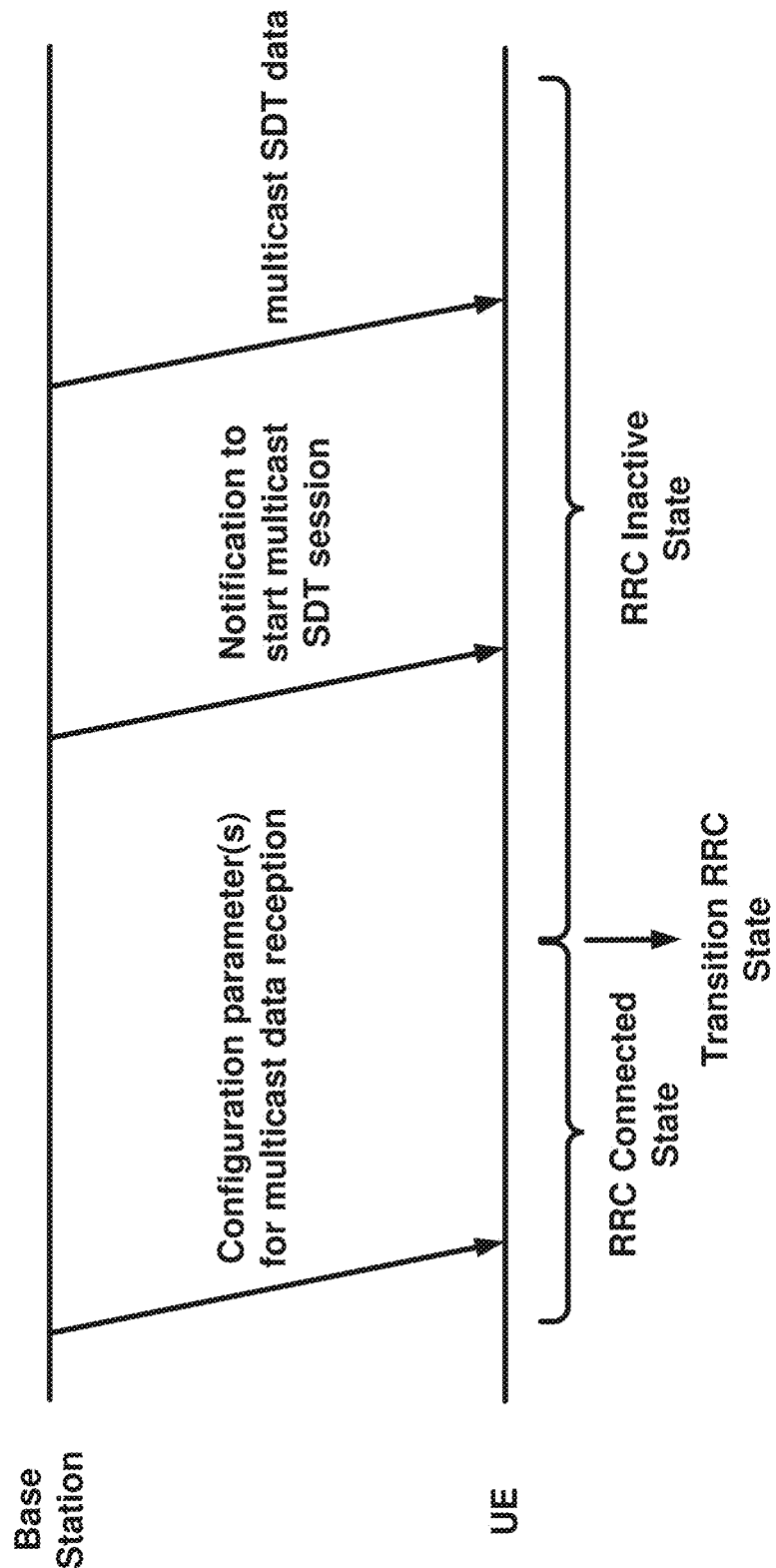
FIG. 17 shows an example process according to some aspects of some of various exemplary embodiments of the present disclosure.

In an example embodiment as shown in FIG. 17, a UE may one or more messages (e.g., dedicated signaling, e.g., based on one or more RRC messages). The UE may receive the one or more messages during an RRC connected state. The one or more messages may comprise one or more configuration parameters associated with reception of multicast data. In some examples, at least some of the one or more configuration parameters may be used for multicast data transmission in both of the RRC connected state and the RRC inactive state (e.g., for multicast SDT reception). In some examples, receiving the one or more configuration parameters may be in response to transmission, by the UE to a base station, a request signaling indicating a request for reception of multicast data (e.g., a request for reception of multicast SDT data), e.g., to join a multicast group. In some examples, at least some of the one or more configuration parameters may be used for multicast data transmission only during the RRC inactive state. In some examples, at least some of the one or more configuration parameters may be used for multicast data transmission only during the RRC connected state. In some examples, at least some of the one or more configuration parameters may be received by an RRC release message (for example, a suspend config IE included in the RRC release message) that indicates transitioning from the RRC connected state to the RRC inactive state. In some examples, at least some of the one or more configuration parameters (e.g., one or more first configuration parameters) may indicate and/or may be used in determination of radio resources for reception of multicast SDT data. In some examples, at least some of the one or more configuration parameters (e.g., one or more first configuration parameters) may indicate and/or may be used in determination of radio resources for reception of notification signaling associated with multicast SDT session start and/or multicast SDT data transmission. In some examples, at least some of the one or more configuration parameters (e.g., one or more first configuration parameters) may indicate and/or may be used in determination of radio resources for transmission of uplink feedback associated with the multicast SDT data/multicast SDT session.

In some examples, the one or more configuration parameters may comprise at least one parameter indicating an identifier of a multicast group. The at least one parameter may indicate that the one or more configuration parameters are for reception of multicast SDT data associated with the indicated multicast group.

In some examples, the one or more configuration parameters may comprise BWP configuration parameters (e.g., indicating identifiers of one or more BWPs) of one or more BWPs based on which the SDT data (e.g., the multicast SDT data during the RRC inactive state) may be received.

In some examples, the one or more configuration parameters may comprise CORESET/search space configuration parameters of one or more CORESETs/search spaces associated with multicast SDT transmissions during the RRC inactive state. In some examples, the one or more CORESETs may be used for monitoring a control channel for reception of scheduling information or other control information associated with multicast SDT transmission.

In some examples, the one or more configuration parameters may comprise one or more parameters indicating a G-RNTI and/or a G-CS-RNTI wherein the G-RNTI and/or G-CS-RNTI may be associated with DCIs that are used in scheduling multicast SDT data and/or reception of notifications associated with multicast SDT data.

The UE may transition from the RRC connected state to an RRC inactive state. In some examples, transitioning from the RRC connected state to the RRC inactive state may be in response to receiving an RRC release message. The RRC release message may comprise a suspend config IE indicating the transitioning from the RRC connected state to the RRC inactive state. In some examples, the RRC release (e.g., the suspend config IE in the RRC release message) may comprise at least some of the one or more configuration parameters associated with reception of multicast data (e.g., for reception of the multicast data during the RRC release message).

In response to the transitioning from the RRC connected state to the RRC inactive state and while in the RRC inactive state, the wireless device may receive a notification (e.g., via a notification signaling, e.g., via a paging message) indicating start of a multicast SDT session. In some examples, the notification message (e.g., the paging message) may indicate (e.g., may comprise a field with a value indicating) an identifier of multicast data/group. In some examples, the notification signaling may be used for UEs in the RRC inactive state and one or more UEs in RRC connected state. In some examples, the notification may indicate an offset, wherein a multicast SDT session for receiving multicast SDT data may start after the indicated offset from the notification message (e.g., the paging message). In response to receiving the notification, the UE may receive the multicast SDT data.

In some examples, receiving the multicast SDT data, e.g., in response to receiving the notification, may be based on configured grant scheduling or based on dynamic scheduling. For example, the one or more configuration parameters (e.g., received via the RRC release message or via a suspend config IE in the RRC release message) may comprise parameters for determination of configured grant resources for reception. In some examples, the UE may receive an activation signaling (e.g., DCI, e.g., associated with a G-CS-RNTI) indicating activation of configured grant resources for reception of multicast SDT. In some examples, the UE may receive a DCI (e.g., associate with G-RNTI) indicating a dynamic grant for reception of multicast SDT data. The reception of activation signaling or dynamic grant may be based on monitoring a CORESET associated with multicast data (e.g., multicast SDT) reception.

In some examples, the UE may transmit uplink feedback (e.g., layer 1/layer 2 feedback such as HARQ ACK/NACK and/or application layer feedback) associate with the multicast SDT data. In some examples, transmission of the uplink feedback (e.g., radio resources for transmission of the uplink feedback) may be based on the one or more configuration parameters (e.g., included in the RRC release message). In some examples, the uplink feedback may comprise CSI report.

In an example embodiment, a user equipment (UE), while in a radio resource control (RRC) connected state, may receive one or more configuration parameters associated with reception of multicast data. The UE may transition from the RRC connected state to an RRC inactive state. The UE may receive, while in the RRC inactive state, a notification indicating start of a multicast SDT session. The UE may receive multicast SDT data in response to receiving the notification.

In some examples, at least some of the one or more configuration parameters may be used by the user equipment (UE) for reception of the multicast data in the radio resource control (RRC) connected state and the RRC inactive state.

In some examples, at least some of the one or more configuration parameters may be used by the user equipment (UE) for reception of the multicast data in the radio resource control (RRC) connected state and not in the RRC inactive state.

In some examples, at least some of the one or more configuration parameters may be used by the user equipment (UE) for reception of the multicast data in the radio resource control (RRC) inactive state and not in the RRC connected state.

In some examples, the one or more configuration parameters may comprise one or more first parameters used in determination of radio resources for reception of the multicast small data transmission (SDT) data. In some examples, the one or more first parameters may be used in determination of radio resources for reception of notification signaling associated with multicast small data transmission (SDT) data.

In some examples, the one or more configuration parameters may comprise one or more second parameters used in determination of radio resources for transmission of uplink feedback associated with multicast small data transmission (SDT) data.

In some examples, the one or more configuration parameters may comprise an identifier parameter indicating an identifier of a multicast group identifier.

In some examples, the one or more configuration parameters may comprise bandwidth part (BWP) parameters of one or more BWPs for reception of multicast data.

In some examples, the one or more configuration parameters may comprise control resource set (CORESET) parameters of one or more CORESETs for reception of multicast data.

In some examples, the one or more configuration parameters may comprise a parameter indicating a group radio network temporary identifier (G-RNTI) or a group configured scheduling RNTI (G-CS-RNTI) used in monitoring a control channel for reception of scheduling information associated with multicast data.

In some examples, receiving the one or more configuration parameters may be based on receiving one or more radio resource control (RRC) messages.

In some examples, receiving the one or more configuration parameters may be in response to transmission, by the user equipment (UE) to a base station, a request signaling indicating a request to join a multicast group.

In some examples, the notification may be based on a paging message.

In some examples, a signaling used for the notification may comprise a field with a value indicating an identifier of multicast group.

In some examples, a signaling used for the notification may be common for one or more first user equipments (UEs) in radio resource control (RRC) connected state and one or more second UEs in the RRC inactive state.

In some examples, receiving the multicast small data transmission (SDT) data may be based on configured grant scheduling. In some examples, the UE may monitor a control channel for a group configured scheduling radio network temporary identifier (G-CS-RNTI) for receiving an activation signaling. In some examples, the monitoring may be for a control resource set (CORESET) associated with the multicast data reception.

In some examples, receiving the multicast small data transmission (SDT) data may be based on dynamic scheduling. In some examples, the UE may monitor a control channel for a group radio network temporary identifier (G-RNTI) for receiving scheduling information. In some examples, the monitoring may be for a control resource set (CORESET) associated with the multicast data reception.

In some examples, the UE may transmit uplink feedback associated with the multicast data reception. In some examples, the uplink feedback may comprise layer 1 or layer 2 feedback. In some examples, the layer 1 or layer 2 feedback may comprise hybrid automatic repeat request (HARQ) feedback. In some examples, the uplink feedback may comprise application layer feedback. In some examples, the uplink feedback may be based on the one or more configuration parameters. In some examples, transmitting the uplink feedback may be without transitioning to the radio resource control (RRC) connected state and in the RRC inactive state. In some examples, transmitting the uplink feedback may be based on transitioning to the radio resource control (RRC) connected state. In some examples, transmitting the uplink feedback, during the radio resource control (RRC) inactive state, may be based on a random access process. In some examples, the random access process may be based on one or more configuration parameters received in a radio resource control (RRC) release message. In some examples, transmitting the uplink feedback, during the radio resource control (RRC) inactive state, may be based on a configured grant resource. In some examples, the configured grant resource may be based on one or more configuration parameters received in a radio resource control (RRC) release message. In some examples, the uplink feedback may comprise a channel state information (CSI) report.

In some examples, the transitioning may be in response to receiving a radio resource control (RRC) release message. In some examples, the RRC release message may comprise a suspend config information element (IE) indicating the transitioning.

The exemplary blocks and modules described in this disclosure with respect to the various example embodiments may be implemented or performed with a general-purpose processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. Examples of the general-purpose processor include but are not limited to a microprocessor, any conventional processor, a controller, a microcontroller, or a state machine. In some examples, a processor may be implemented using a combination of devices (e.g., a combination of a DSP and a microprocessor, multiple microprocessors, one or more microprocessors in conjunction with a DSP core, or any other such configuration).

The functions described in this disclosure may be implemented in hardware, software executed by a processor, firmware, or any combination thereof. Instructions or code may be stored or transmitted on a computer-readable medium for implementation of the functions. Other examples for implementation of the functions disclosed herein are also within the scope of this disclosure. Implementation of the functions may be via physically co-located or distributed elements (e.g., at various positions), including being distributed such that portions of functions are implemented at different physical locations.

Computer-readable media includes but is not limited to non-transitory computer storage media. A non-transitory storage medium may be accessed by a general purpose or special purpose computer. Examples of non-transitory storage media include, but are not limited to, random access memory (RAM), read-only memory (ROM), electrically erasable programmable ROM (EEPROM), flash memory, compact disk (CD) ROM or other optical disk storage, magnetic disk storage or other magnetic storage devices, etc. A non-transitory medium may be used to carry or store desired program code means (e.g., instructions and/or data structures) and may be accessed by a general-purpose or special-purpose computer, or a general-purpose or special-purpose processor. In some examples, the software/program code may be transmitted from a remote source (e.g., a website, a server, etc.) using a coaxial cable, fiber optic cable, twisted pair, digital subscriber line (DSL), or wireless technologies such as infrared, radio, and microwave. In such examples, the coaxial cable, fiber optic cable, twisted pair, DSL, or wireless technologies such as infrared, radio, and microwave are within the scope of the definition of medium. Combinations of the above examples are also within the scope of computer-readable media.

As used in this disclosure, use of the term "or" in a list of items indicates an inclusive list. The list of items may be prefaced by a phrase such as "at least one of" or "one or more of". For example, a list of at least one of A, B, or C includes A or B or C or AB (i.e., A and B) or AC or BC or ABC (i.e., A and B and C). Also, as used in this disclosure, prefacing a list of conditions with the phrase "based on" shall not be construed as "based only on" the set of conditions and rather shall be construed as "based at least in part on" the set of conditions. For example, an outcome described as "based on condition A" may be based on both a condition A and a condition B without departing from the scope of this disclosure.

In this specification the terms "comprise", "include" or "contain" may be used interchangeably and have the same meaning and are to be construed as inclusive and open-ending. The terms "comprise", "include" or "contain" may be used before a list of elements and indicate that at least all of the listed elements within the list exist but other elements that are not in the list may also be present. For example, if A comprises B and C, both {B, C} and {B, C, D} are within the scope of A.

The present disclosure, in connection with the accompanied drawings, describes example configurations that are not representative of all the examples that may be implemented or all configurations that are within the scope of this disclosure. The term "exemplary" should not be construed as "preferred" or "advantageous compared to other examples" but rather "an illustration, an instance or an example." By reading this disclosure, including the description of the embodiments and the drawings, it will be appreciated by a person of ordinary skills in the art that the technology disclosed herein may be implemented using alternative embodiments. The person of ordinary skill in the art would appreciate that the embodiments, or certain features of the embodiments described herein, may be combined to arrive at yet other embodiments for practicing the technology described in the present disclosure. Thus, the disclosure is not limited to the examples and designs described herein but is to be accorded the broadest scope consistent with the principles and novel features disclosed herein.

The invention claimed is:

1. A method of multicasting using small data transmission (SDT), comprising the steps of:
   receiving, by a user equipment (UE) while in a radio resource control (RRC) connected state, one or more configuration parameters associated with reception of multicast SDT data, wherein:
      the multicast SDT data is a type of SDT data directed to a plurality of user equipments (UEs); and
      the one or more configuration parameters are specific to the multicast SDT data type;
   transitioning, by the UE, from the RRC connected state to an RRC inactive state;
   receiving, while in the RRC inactive state, a notification indicating start of a multicast SDT session;
   receiving, by the UE while in the RRC inactive state, multicast SDT data pursuant to the notification, wherein:
      the multicast SDT data also is received by at least one other UE that is in the RRC connected state.

2. The method of claim 1, wherein at least one configuration parameter of the one or more configuration parameters is used by the user equipment (UE) for reception of the multicast data in the radio resource control (RRC) connected state and the RRC inactive state.

3. The method of claim 1, wherein at least one configuration parameter of the one or more configuration parameters is used by the user equipment (UE) for reception of the multicast SDT data in the radio resource control (RRC) connected state and not in the RRC inactive state.

4. The method of claim 1, wherein at least one configuration parameter of the one or more configuration parameters is used by the user equipment (UE) for reception of the multicast data in the radio resource control (RRC) inactive state and not in the RRC connected state.

5. The method of claim 1, wherein the one or more configuration parameters comprise one or more first parameters used to determine radio resources for reception of the multicast small data transmission (SDT) data.

6. The method of claim 5, wherein the one or more first parameters are used to determine radio resources for reception of notification signaling associated with multicast small data transmission (SDT) data.

7. The method of claim 1, wherein the one or more configuration parameters comprise one or more second parameters used to determine radio resources for transmission of uplink feedback associated with multicast small data transmission (SDT) data.

8. The method of claim 1, wherein the one or more configuration parameters comprise an identifier parameter indicating an identifier of a multicast group identifier.

9. The method of claim 1, wherein the one or more configuration parameters comprise bandwidth part (BWP) parameters of one or more BWPs for reception of multicast data.

10. The method of claim 1, wherein the one or more configuration parameters comprise control resource set (CORESET) parameters of one or more CORESETs for reception of multicast data.

11. The method of claim 1, wherein the one or more configuration parameters comprise a parameter indicating a group radio network temporary identifier (G-RNTI) or a group configured scheduling RNTI (G-CS-RNTI) used in monitoring a control channel for reception of scheduling information associated with multicast data.

12. The method of claim 1, wherein the one or more configuration parameters are received based on receipt of one or more radio resource control (RRC) messages.

13. The method of claim 1, wherein the one or more configuration parameters are received in response to transmission, by the user equipment (UE) to a base station, a request signaling indicating a request to join a multicast group.

14. The method of claim 1, wherein the notification is based on a paging message.

15. The method of claim 1, wherein a signaling used for the notification comprises a field with a value identifier of a multicast group.

16. The method of claim 1, wherein a signaling used for the notification is common for one or more first user equipments (UEs) in the radio resource control (RRC) connected state and one or more second UEs in the RRC inactive state.

17. The method of claim 1, wherein the multicast small data transmission (SDT) data is received based on configured grant scheduling.

18. The method of claim 17, further comprising monitoring a control channel for a group configured scheduling radio network temporary identifier (G-CS-RNTI) for receipt of an activation signaling.

19. The method of claim 18, wherein the monitoring monitors for a control resource set (CORESET) associated with the multicast data reception.

20. The method of claim 1, wherein the multicast small data transmission (SDT) data is received based on dynamic scheduling.

* * * * *